United States Patent
Suzuki et al.

(10) Patent No.: US 9,180,635 B2
(45) Date of Patent: Nov. 10, 2015

(54) OPTICAL ELEMENT, METHOD OF MANUFACTURING OPTICAL ELEMENT, ILLUMINATION DEVICE, WINDOW MEMBER, AND FITTING

(71) Applicant: DEXERIALS CORPORATION, Tokyo (JP)

(72) Inventors: Masaki Suzuki, Miyagi (JP); Hayato Hasegawa, Miyagi (JP); Masashi Enomoto, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 13/964,810

(22) Filed: Aug. 12, 2013

(65) Prior Publication Data

US 2014/0041796 A1 Feb. 13, 2014

Related U.S. Application Data

(62) Division of application No. 13/196,053, filed on Aug. 2, 2011, now Pat. No. 8,520,305.

(30) Foreign Application Priority Data

Aug. 9, 2010 (JP) ................................. 2010-178947

(51) Int. Cl.
*G02B 5/28* (2006.01)
*B29D 11/00* (2006.01)
(Continued)

(52) U.S. Cl.
CPC ...... *B29D 11/0073* (2013.01); *B29D 11/00605* (2013.01); *F21S 11/00* (2013.01);
(Continued)

(58) Field of Classification Search
CPC .......................................................... G02B 5/02
USPC .......................................................... 359/597
See application file for complete search history.

(56) References Cited

U.S. PATENT DOCUMENTS 721,256 A * 2/1903 Wadsworth .................... 359/595
737,979 A * 9/1903 Wadsworth .................... 359/594
(Continued)

FOREIGN PATENT DOCUMENTS

JP 2000-213255 A 8/2000
JP 2000-268610 A 9/2000
(Continued)

OTHER PUBLICATIONS

Japanese Patent Office, Submission of Publications and the like dated Feb. 4, 2014 in Japanese Patent Application No. 2010-178947 w/English-language Translation.
(Continued)

*Primary Examiner* — Clayton E Laballe
*Assistant Examiner* — Kevin Butler
(74) *Attorney, Agent, or Firm* — Oliff PLC

(57) ABSTRACT

An optical element includes a first surface, a second surface positioned to face the first surface, and a plurality of reflecting surfaces arrayed in a first region defined by the first surface and the second surface, wherein the reflecting surfaces have a first length in a first direction vertical to the first surface and are arrayed at a pitch in a second direction perpendicular to the first direction, light incident on one of the first surface and the second surface is reflected by the reflecting surfaces toward the other surface, and predetermined parameters satisfy predetermined relational formulae representing conditions for ensuring total reflection at the reflecting surfaces and for avoiding total reflection at a light emergent surface.

6 Claims, 29 Drawing Sheets

(51) Int. Cl.
*F21S 11/00* (2006.01)
*G02B 17/00* (2006.01)
*G02B 19/00* (2006.01)
*E04D 13/03* (2006.01)
*F21S 19/00* (2006.01)
*G02B 1/115* (2015.01)
*G02B 5/20* (2006.01)

(52) U.S. Cl.
CPC ......... *G02B 17/006* (2013.01); *G02B 19/0028* (2013.01); *G02B 19/0042* (2013.01); *E04D 13/033* (2013.01); *E04D 2013/0345* (2013.01); *F21S 19/00* (2013.01); *G02B 1/115* (2013.01); *G02B 5/201* (2013.01); *G02B 5/205* (2013.01); *G02B 5/285* (2013.01); *G02B 5/287* (2013.01); *Y02B 10/20* (2013.01); *Y10T 156/1036* (2015.01)

(56) References Cited

U.S. PATENT DOCUMENTS

| | | | | |
|---|---|---|---|---|
| 2,812,692 | A * | 11/1957 | Boyd | 359/593 |
| 3,393,034 | A * | 7/1968 | Imai | 359/593 |
| 3,758,197 | A * | 9/1973 | Klang et al. | 359/833 |
| 3,860,814 | A * | 1/1975 | Klang et al. | 250/227.11 |
| 4,148,563 | A * | 4/1979 | Herbert | 359/200.7 |
| 4,509,825 | A | 4/1985 | Otto et al. | |
| 4,630,892 | A * | 12/1986 | Howard | 359/597 |
| 4,989,952 | A * | 2/1991 | Edmonds | 359/592 |
| 5,039,352 | A * | 8/1991 | Mueller et al. | 136/246 |
| 5,300,783 | A * | 4/1994 | Spencer et al. | 250/462.1 |
| 5,461,496 | A * | 10/1995 | Kanada et al. | 359/592 |
| 5,650,875 | A * | 7/1997 | Kanada et al. | 359/592 |
| 5,877,874 | A * | 3/1999 | Rosenberg | 359/15 |
| 5,880,886 | A * | 3/1999 | Milner | 359/599 |
| 5,995,690 | A * | 11/1999 | Kotz et al. | 385/25 |
| 6,210,785 | B1 * | 4/2001 | Weber et al. | 428/212 |
| 6,333,914 | B1 * | 12/2001 | Ohki et al. | 369/286 |
| 6,424,406 | B1 * | 7/2002 | Mueller et al. | 359/613 |
| 6,435,683 | B1 | 8/2002 | Milner | |
| 6,616,285 | B2 | 9/2003 | Milner | |
| 7,070,314 | B2 * | 7/2006 | Edmonds | 362/600 |
| 2002/0159154 | A1 * | 10/2002 | Milner | 359/613 |
| 2008/0180026 | A1 | 7/2008 | Kondo et al. | |
| 2009/0190210 | A1 | 7/2009 | Coleman et al. | |
| 2011/0067688 | A1 * | 3/2011 | Reif et al. | 126/600 |
| 2012/0033302 | A1 * | 2/2012 | Suzuki et al. | 359/597 |
| 2012/0212825 | A1 * | 8/2012 | Nomura et al. | 359/580 |
| 2012/0300306 | A1 * | 11/2012 | Nagahama et al. | 359/601 |
| 2013/0033873 | A1 * | 2/2013 | Suzuki et al. | 362/297 |
| 2013/0265642 | A1 * | 10/2013 | Vasylyev | 359/595 |
| 2014/0133030 | A1 * | 5/2014 | Gardiner | 359/592 |

FOREIGN PATENT DOCUMENTS

| | | | | |
|---|---|---|---|---|
| JP | A-2001-503190 | | 3/2001 | |
| JP | 2003-315516 A | | 11/2003 | |
| JP | 2004-133148 A | | 4/2004 | |
| JP | A-2005-3513531 | | 1/2005 | |
| JP | 2008-242232 A | | 10/2008 | |
| JP | A-2008-247623 | | 10/2008 | |
| JP | 2009-163906 A | | 7/2009 | |
| JP | 2009-266794 | * | 11/2009 | ........ E06B 3/66 |
| JP | A-2009-266794 | | 11/2009 | |
| JP | A-2010-076614 | | 4/2010 | |
| JP | 2011-069126 | * | 4/2011 | ........ E06B 3/66 |
| JP | A-2011-069126 | | 4/2011 | |
| JP | A-2002-526906 | | 8/2011 | |
| JP | A-2012-202642 | | 10/2012 | |

OTHER PUBLICATIONS $6^{th}$ Edition of Kagaku Binran, (Chemistry Handbook), Applied Chemistry vol. 1 (edited by Chemical Society of Japan), Part III: Basic Chemicals—Chapter 16: Basic Polymer, p. 816, Table 16.6.
Jun. 9, 2015 Office Action issued in Japanese Patent Application No. 2014-179920.

* cited by examiner

151

151

151

151

151

151

151

OPTICAL ELEMENT, METHOD OF MANUFACTURING OPTICAL ELEMENT, ILLUMINATION DEVICE, WINDOW MEMBER, AND FITTING

CROSS REFERENCES TO RELATED APPLICATIONS

This is a Division of application Ser. No. 13/196,053 filed Aug. 2, 2011, and claims priority to Japanese Application No. JP 2010-178947 filed in the Japanese Patent Office on Aug. 9, 2010. The disclosures of each of the prior applications are hereby incorporated by reference herein in their entirety.

BACKGROUND

The present technology relates to an optical element that is used in a collector for collecting the sunlight or artificial light. The present technology also relates to a method of manufacturing the optical element, an illumination device, a window member, and a fitting.

Recently, sunlight collectors have been developed with the view of reducing electric power consumed by lighting apparatuses, when they are used in the daytime, by taking in the sunlight incoming from the sky toward the ceiling inside a house or a building. Various types of structures, e.g., a light duct, a louver, and a window blind (shade), are employed as related-art sunlight collectors.

For example, Japanese Unexamined Patent Application Publication (Translation of PCT Application) No. 2002-526906 describes an optical component for causing incident light to be directionally output by utilizing total reflection generated at a gap (space) that is formed inside an optically transparent body. Japanese Unexamined Patent Application Publication No. 2009-266794 describes a sunlight illuminator including a plurality of bar-shaped element members made of a transparent material, and a support for supporting the plural element members such that the element members are arrayed parallel to each other. In the sunlight illuminator, the sunlight incoming from the outdoor side is reflected by reflecting surfaces of the element members to be introduced toward the ceiling in the indoor side. Japanese Patent No. 3513531 describes a sunlight collector for causing incident light to be diffusively output through bar-like members, which are arrayed on the surface of a transparent body in the form of a flat plate. Japanese Unexamined Patent Application Publication No. 2001-503190 describes an optical guide plate in which, in a plate made of a transparent plastic having a first refractive index, a plurality of thin belt-like members made of a plastic having a second refractive index are inserted such that incident light is directionally output due to the difference in refractive index between the plate and the belt-like members.

SUMMARY

In the field of the sunlight collector, an increase in efficiency of taking in the sunlight or in efficiency of outputting the sunlight upward is desired. With the structures described in the above-cited patent documents, however, the sunlight collector is to be larger in thickness for directionally outputting the incident light with high efficiency. In other words, there has been a difficulty in constructing the sunlight collector in the form of a thin film.

Thus, it is desirable to provide an optical element, which can increase the efficiency of taking in light and which is adaptable for a reduction of an element thickness. It is also desirable to provide a method of manufacturing the optical element, an illumination device, a window member, and a fitting.

The inventors have conducted intensive studies with intent to overcome the above-mentioned problems in the related art. As a result, the inventors have found an optical element and an illumination device, the optical element including a structure layer that has a plurality of reflecting surfaces and that satisfies a predetermined relationship among a length of each of the plural reflecting surfaces in a one-dimensional direction, an array pitch of the plural reflecting surfaces, and an incident angle of incident light.

For the reason in the manufacturing process, however, the structure layer is often deviated (deformed) from the shape as per design values. The deviation of the shape of the reflecting surfaces from that as per the design values adversely affects expected optical characteristics.

In view of the above-mentioned problem, the inventors have conducted intensive studies with intent to obtain the desired optical characteristics even when the shape of the reflecting surfaces is deviated from that as per the design values. As a result, the inventors have found an optical element in which the shape of the reflecting surfaces is designed to satisfy predetermined relational formulae by quantitatively evaluating the relationships between the deviations from the shape as per the design values and the optical characteristics. Further, the inventors have found a method of manufacturing the optical element, an illumination device, a window member, and a fitting, the latter threes each employing the optical element.

According to one embodiment, an optical element includes a first surface, a second surface positioned to face the first surface, and a plurality of reflecting surfaces arrayed in a first region defined by the first surface and the second surface, wherein the reflecting surfaces have a first length in a first direction vertical to the first surface and are arrayed at a pitch in a second direction perpendicular to the first direction, light incident on one of the first surface and the second surface is reflected by the reflecting surfaces toward the other surface, and following formulae (1) and (9) are satisfied:

$$d = (2n-1)\frac{p}{\tan\beta} (n \in N) \qquad (1)$$

$$(n_p + n_{air}\sin\alpha)(n_p - n_{air}\sin\alpha)\sin^2 2\psi \le n_{air}^2(1 - \cos 2\psi \sin\alpha)^2 \qquad (9)$$

(where d is the first length, n is a number of total reflections of the incident light at the same reflecting surface, p is an array pitch of the reflecting surfaces, β is an angle formed between a projection of the light impinging on the reflecting surface to a surface including the first and second directions and a tangential line at an arbitrary point on the reflecting surface (6.5°≤β≤87.5), N is a set of natural numbers, $n_p$ is a refractive index inside the region defined by the first surface and the second surface, $n_{air}$ is a refractive index of air, α is an incidence angle of the light incident on the optical element, and ψ is an angle formed in the surface including the first and second directions between a tangential line at an arbitrary point on the reflecting surface and the first direction).

According to another embodiment, an optical element includes a first surface, a second surface positioned to face the first surface, and a plurality of reflecting surfaces arrayed in a first region defined by the first surface and the second surface, wherein the reflecting surfaces have a curvature in at least a portion thereof, have a first length in, a first direction vertical to the first surface, and are arrayed at a pitch in a second direction perpendicular to the first direction, light incident on one of the first surface and the second surface is reflected by the reflecting surfaces toward the other surface, and following formulae (1) and (16) are satisfied:

$$d = (2n-1)\frac{p}{\tan\beta} (n \in N) \quad (1)$$

$$(\beta + \xi) \le \text{Arccos}\left(\frac{-n_{air}}{n_p}\right) \quad (16)$$

(where d is the first length, n is a number of total reflections of the incident light at the same reflecting surface, p is an array pitch of the reflecting surfaces, β is an angle formed between a projection of the light impinging on the reflecting surface to a surface including the first and second directions and a tangential line at an arbitrary point on the reflecting surface (6.5°≤β≤87.5), N is a set of natural numbers, $n_p$ is a refractive index inside the region defined by the first surface and the second surface, $n_{air}$ is a refractive index of air, and ξ is an angle of divergence of light diverging after being focused, the light impinging on the reflecting surface, when the portion of the reflecting surface having the curvature is regarded as a lens).

According to still another embodiment, an optical element includes a first surface, a second surface positioned to face the first surface, and a plurality of reflecting surfaces arrayed in a first region defined by the first surface and the second surface, wherein the reflecting surfaces have fine ruggedness, have a first length in a first direction vertical to the first surface, and are arrayed at a pitch in a second direction perpendicular to the first direction, light incident on one of the first surface and the second surface is reflected by the reflecting surfaces toward the other surface, an energy distribution of the light reflected by the reflecting surfaces is a Gaussian distribution with a direction of specular reflection being a center, a standard deviation of the Gaussian distribution is 5° or less, and a following formula (1) is satisfied:

$$d = (2n-1)\frac{p}{\tan\beta} (n \in N) \quad (1)$$

(where d is the first length, n is a number of total reflections of the incident light at the same reflecting surface, p is an array pitch of the reflecting surfaces, β is an angle formed between a projection of the light impinging on the reflecting surface to a surface including the first and second directions and a tangential line at an arbitrary point on the reflecting surface (6.5°≤β≤87.5°), and N is a set of natural numbers).

According to still another embodiment, a method of manufacturing an optical element includes transferring a concave-convex shape formed in a master to a transfer material, thereby forming a first light transmissive layer that has a plurality of reflecting surfaces in a transfer surface thereof, and joining the first light transmissive layer to a second light transmissive layer, wherein the reflecting surfaces have a first length in a depth direction of the concave-convex shape of the transfer surface and are arrayed at a pitch in a second direction perpendicular to the depth direction of the concave-convex shape, light incident on one principal surface of one of the first light transmissive layer and the second light transmissive layer is reflected by the reflecting surfaces toward one principal surface of the other layer, and following formulae (1) and (9) are satisfied:

$$d = (2n-1)\frac{p}{\tan\beta} (n \in N) \quad (1)$$

$$(n_p + n_{air}\sin\alpha)(n_p - n_{air}\sin\alpha)\sin^2 2\psi \le n_{air}^2(1 - \cos 2\psi \sin\alpha)^2 \quad (9)$$

(where d is the first length, n is a number of total reflections of the incident light at the same reflecting surface, p is an array pitch of the reflecting surfaces, β is an angle formed between a projection of the light impinging on the reflecting surface to a surface including the first and second directions and a tangential line at an arbitrary point on the reflecting surface (6.5°≤β≤87.5°), N is a set of natural numbers, $n_p$ is a refractive index of the first light transmissive layer, $n_{air}$ is a refractive index of air, α is an incidence angle of the light incident on the optical element, and ψ is an angle formed in the surface including the first and second directions between a tangential line at an arbitrary point on the reflecting surface and the first direction).

According to still another embodiment, a method of manufacturing an optical element includes transferring a concave-convex shape formed in a master to a transfer material, thereby forming a first light transmissive layer that has a plurality of reflecting surfaces in a transfer surface thereof, and joining the first light transmissive layer to a second light transmissive layer, wherein the reflecting surfaces have a curvature in at least a portion thereof, have a first length in a depth direction of the concave-convex shape of the transfer surface, and are arrayed at a pitch in a second direction perpendicular to the depth direction of the concave-convex shape, light incident on one principal surface of one of the first light transmissive layer and the second light transmissive layer is reflected by the reflecting surfaces toward one principal surface of the other layer, and following formulae (1) and (16) are satisfied:

$$d = (2n-1)\frac{p}{\tan\beta} (n \in N) \quad (1)$$

$$(\beta + \xi) \le \text{Arccos}\left(\frac{-n_{air}}{n_p}\right) \quad (16)$$

(where d is the first length, n is a number of total reflections of the incident light at the same reflecting surface, p is an array pitch of the reflecting surfaces, β is an angle formed between a projection of the light impinging on the reflecting surface to a surface including the first and second directions and a tangential line at an arbitrary point on the reflecting surface (6.5°≤β≤87.5°), N is a set of natural numbers, $n_p$ is a refractive index of the first light transmissive layer, $n_{air}$ is a refractive index of air, and ξ is an angle of divergence of light diverging after being focused, the light impinging on the reflecting surface, when the portion of the reflecting surface having the curvature is regarded as a lens).

According to still another embodiment, a method of manufacturing an optical element includes transferring a concave-convex shape formed in a master to a transfer material, thereby forming a first light transmissive layer that has a plurality of reflecting surfaces in a transfer surface thereof, and joining the first light transmissive layer to a second light transmissive layer, wherein the reflecting surfaces have fine ruggedness, have a first length in a depth direction of the concave-convex shape of the transfer surface, and are arrayed at a pitch in a second direction perpendicular to the depth direction of the concave-convex shape, light incident on one principal surface of one of the first light transmissive layer and the second light transmissive layer is reflected by the reflecting surfaces toward one principal surface of the other layer, and an energy distribution of the light reflected by the reflecting surfaces is a Gaussian distribution with a direction of specular reflection being a center, a standard deviation of the Gaussian distribution is 5° or less, and a following formula (1) is satisfied:

$$d = (2n-1)\frac{p}{\tan\beta} (n \in N) \qquad (1)$$

(where d is the first length, n is a number of total reflections of the incident light at the same reflecting surface, p is an array pitch of the reflecting surfaces, β is an angle formed between a projection of the light impinging on the reflecting surface to a surface including the first and second directions and a tangential line at an arbitrary point on the reflecting surface (6.5°≤β≤87.5°), and N is a set of natural numbers).

In some of the embodiments, the light incident on one of the first surface and the second surface is reflected by the reflecting surfaces toward the other surface. In the other embodiments, the light incident on one principal surface of one of the first light transmissive layer and the second light transmissive layer is reflected by the reflecting surfaces toward one principal surface of the other layer. The shape of the reflecting surfaces is designed to satisfy predetermined relational formulae depending on the type of deviation of the shape of the reflecting surfaces from that as per design values. Therefore, even when the shape of a structure layer is deviated from that as per design values, the light incident on the optical element in a predetermined angle range can be efficiently output in a predetermined angle range. Herein, the term "shape as per design values" implies the shape obtained, for example, as follows. When the structure layer is constituted by a plurality of structure units each to be formed in a rectangular shape, the structure unit has an ideal rectangular shape free from distortions.

With the embodiments, even when the shape of the structure layer is deviated from that as per design values, the desired characteristics can be obtained.

Additional features and advantages are described herein, and will be apparent from the following Detailed Description and the figures.

DETAILED DESCRIPTION

Embodiments of the present application will be described below in detail with reference to the drawings.

1. First embodiment (in which the shape of a structure layer includes tilting or curving)
2. Second embodiment (in which the shape of a distal end of a structure unit forming the structure layer is rounded)
3. Third embodiment (in which the surface of the structure layer has fine ruggedness)
4. Modifications

1. FIRST EMBODIMENT

Figure 1:
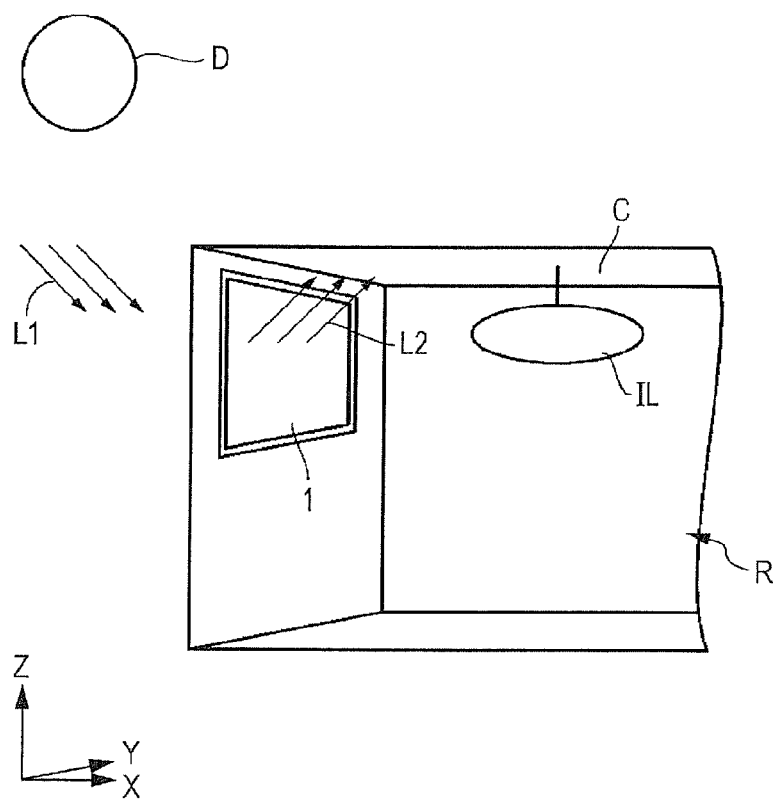
FIG. 1 is a schematic perspective view illustrating an example in which an optical element according to an embodiment is applied to a sunlight collector.

FIG. 1 is a schematic perspective view of the interior of a room, the view illustrating an example in which an optical element 1 according to an embodiment is applied to a window. The optical element 1 is constituted as a sunlight collector for taking into a room R incident light L1 incoming from the outdoor, i.e., from the sun D. For example, the optical element 1 is used in the form of a window member for a building. The optical element 1 has the function of directionally outputting the incident light L1 incoming from the sky toward a ceiling C of the room R. The sunlight taken in toward the ceiling C is diffusively reflected by the ceiling C to illuminate the interior of the room R. Thus, because the sunlight is utilized for lighting in the room, electric power consumed by an illumination device IL in the daytime can be reduced.

Basic Construction of Optical Element

Figure 2:
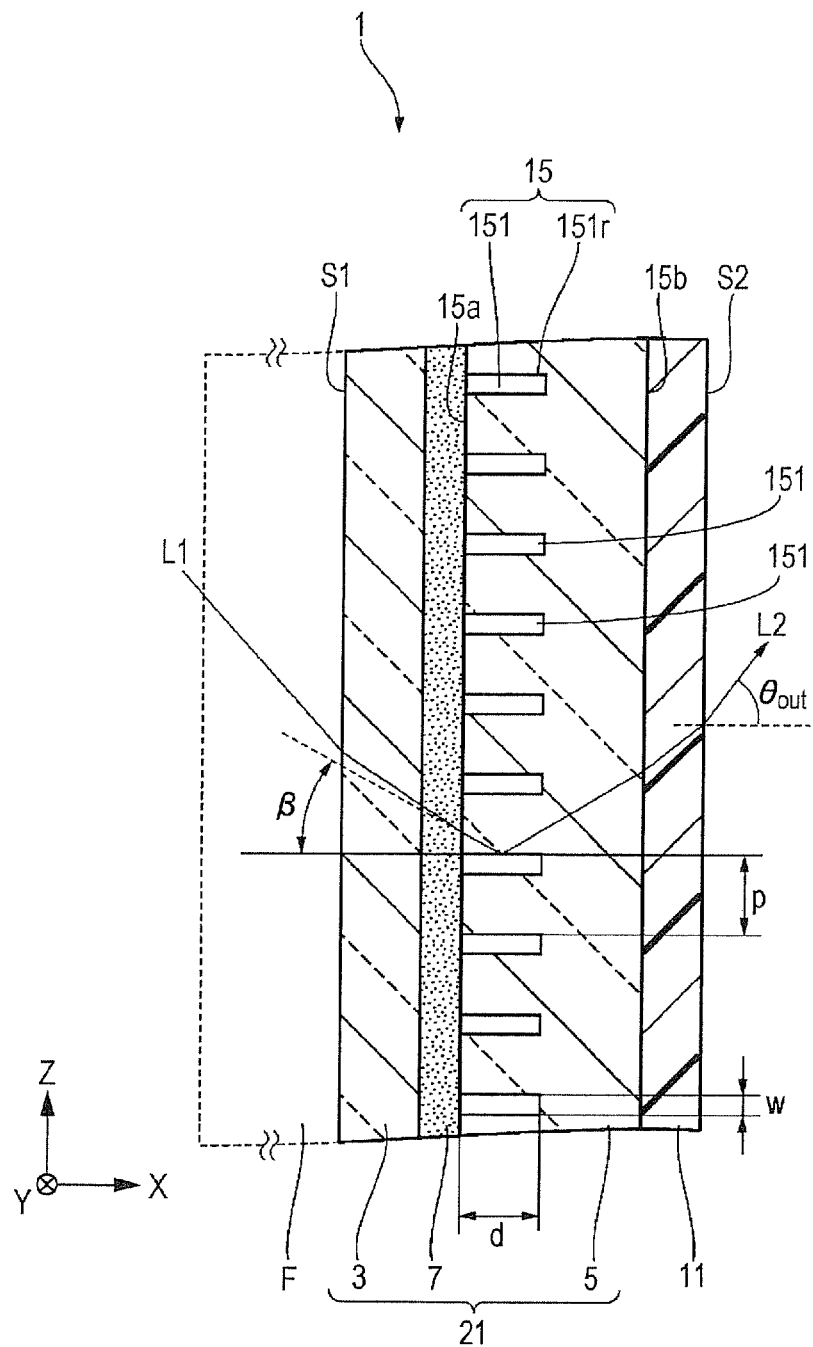
FIG. 2 is a sectional view of an optical element according to a first embodiment.

FIG. 2 is a schematic sectional view illustrating the construction of the optical element 1. The optical element 1 has a multilayer structure including a first light transmissive layer 3, a second light transmissive layer 5, and a base 11. In FIG. 2, an X-axis direction represents the direction of thickness of the optical element 1, i.e., the direction perpendicular to a light incident surface S1. A Y-axis direction represents the horizontal direction in the surface of the optical element 1, and a Z-axis direction represents the vertical (up and down) direction in the surface of the optical element 1.

The first light transmissive layer 3 contains, e.g., a material having transparency as a primary constituent. Examples of the material of the first light transmissive layer 3 include Triacetylcellulose (TAC), Polyester (Thermoplastic Polyester Elastomer (TPEE)), Polyethyleneterephtalate (PET), Polyimide (PI), Polyamide (PA), aramid, Polyethylene (PE), polyacrylate, polyethersulfone, polysulfone, Polypropylene (PP), diacetyl cellulose, polyvinyl chloride, acryl resin (polymethylmethacrylate (PMMA), Polycarbonate (PC), epoxy resin, urea resin, urethane resin, and melamine resin. However, materials of the first light transmissive layer 3 are not limited to the above-mentioned examples.

The second light transmissive layer 5 includes a structure layer 15 (described in detail later) formed in one surface 15a of the optical element 1, which is positioned to face the first light transmissive layer 3. The structure layer 15 having good shape accuracy can be formed by using a resin material that has an excellent shape transfer property. Examples of the resin material having an excellent shape transfer property include a thermoplastic resin, a thermosetting resin, and an energy-ray curable resin composition, e.g., an ultraviolet curable resin. In this specification, the term "energy-ray curable resin composition" implies a resin composition capable of being cured upon irradiation with an energy ray. Also, the term "energy ray" implies suitable one of energy rays represented by an ultraviolet ray, a visible ray, etc.

The surface 15a of the second light transmissive layer 5 is bonded to the first light transmissive layer 3 with, for example, a transparent bonding layer 7 interposed therebetween. A transparent layer 21 including the structure layer 15 is thereby formed. Thus, the transparent layer 21 is made up of the first light transmissive layer 3, the second light transmissive layer 5, and the bonding layer 7. Be it noted that the term "bonding layer" used in this specification includes an adhesive layer.

The second light transmissive layer 5 contains, e.g., a material having transparency as a primary constituent. While the second light transmissive layer 5 may be made of the same type of resin material as that of the first light transmissive layer 3, the second light transmissive layer 5 preferably contains an ultraviolet curable resin as a primary constituent. Alternatively, the second light transmissive layer 5 may be made of glass.

The ultraviolet curable resin contains, for example, (meth) acrylate and a photopolymerization initiator. The ultraviolet curable resin may further contain, where necessary, a photostabilizer, a flame retardant, a leveling agent, a releasing agent, an antioxidant, etc. As the acrylate, a monomer and/or an oligomer having two or more (meth)acryloyl groups can be used. Examples of such a monomer and/or oligomer include urethane (meth)acrylate, epoxy (meth)acrylate, polyester (meth)acrylate, polyol (meth)acrylate, polyether (meth)acrylate, and melamine (meth)acrylate. Herein, the term "(meth) acryloyl group" implies an acryloyl group or a methacryloyl group. The term "oligomer" used herein implies a molecule having molecular weight of 500 or more to 6000 or less. As the photopolymerization initiator, for example, a benzophenone derivative, an acetophenone derivative, or an anthraquinone derivative can be used alone or in combination.

Examples of the thermoplastic resin include polymethyl methacrylate, polyester resin, polyimide resin, polycarbonate resin, polyolefin resin, polystyrene resin, polyvinyl resin, polyacetal resin, melamine resin, and nylon resin.

Examples of the thermosetting resin include epoxy resin, polyurethane resin, unsaturated polyester resin, phenol resin, and silicone resin. Any type of resin used here is preferably made of a material having high transparency.

The base 11 is formed of a light transmissive resin film that is stacked (laminated) on the other surface 15b (second surface) of the second light transmissive layer 5. The base 11 serves also as a protective layer and contains, e.g., a transparent material as a primary constituent. For example, the base 11 is made of the same type of resin material as that of the first light transmissive layer 3. The base 11 may be stacked on 13 an outer surface of the first light transmissive layer 3 as well in addition to the outer surface of the second light transmissive layer 5.

The optical element 1 having the above-described multilayer structure is stacked on the indoor side of a window member F. The window member F is made of glass. The type of glass used as the window member F is not limited to particular one. For example, a float plate glass, a laminated glass, or a security glass can be employed. In the optical element 1 according to the embodiment, the outer surface of the first light transmissive layer 3 is formed as the light incident surface S1, and an outer surface of the base 11 is formed as a light emergent surface S2. Be it noted that the base 11 can be omitted depending on situations. In such a case, the surface 15b of the second light transmissive layer 5 is preferably formed as the light emergent surface S2.

Structure Layer

The structure layer 15 will be described in detail below.

The structure layer 15 has a periodic structure of spaces (gaps) 151 that are arrayed at a predetermined pitch in the up-and-down direction (Z-direction). Each of the spaces 151 has a depth d (first length) in the X-axis direction (first direction) and a width w (second length) in the Z-axis direction (second direction), and the spaces 151 are formed at an array pitch p in the Z-axis direction. Further, each space 151 is formed linearly in the Y-axis direction.

In FIG. 2, a surface defining each space 151 on the upper side forms a reflecting surface 151r that reflects the incident light L1 incoming through the light incident surface S1 toward the light emergent surface S2. Stated another way, the reflecting surface 151r is formed by the interface between a resin material (first medium) constituting the second light transmissive layer 5 and air (second medium) in the space 151. In one embodiment, the relative refractive index of the second light transmissive layer 5 is set to, e.g., 1.3 to 1.7, thus providing a difference in refractive index between the second light transmissive layer 5 and the air (refractive index of 1) in the space 151. Be it noted that the second medium is not limited to air. For example, the reflecting surface 151r may be formed by filling, in the space 151, a material having a lower refractive index than the second light transmissive layer 5.

Figure 3:
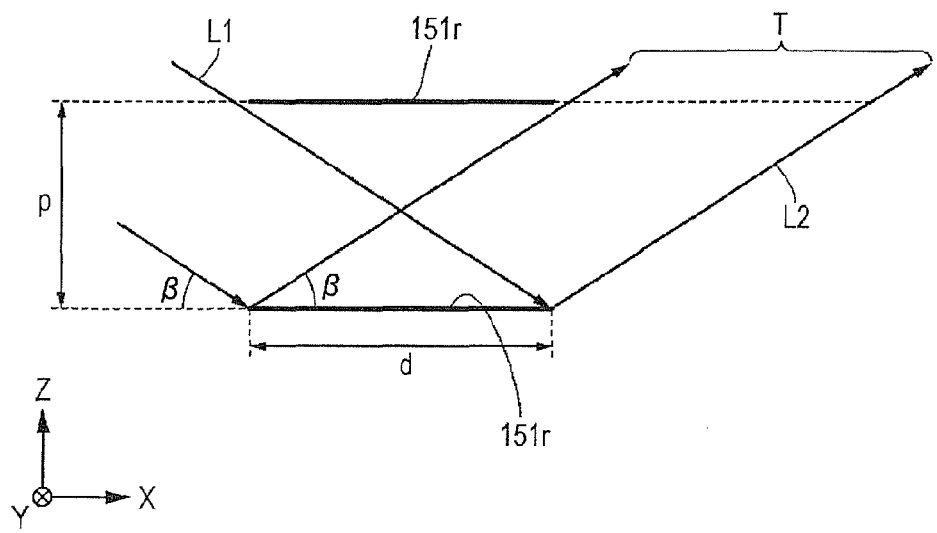
FIG. 3 is an illustration to explain the function of a reflecting surface of the optical element.

FIG. 3 is an illustration to explain the function of the reflecting surface 151r. The reflecting surface 151r produces emergent light L2, which is output upwards, by totally reflecting the incident light L1 impinging on the reflecting surface 151r from above. The expression "upwards" used in this specification implies directions at which an emergence (output) angle $\theta_{out}$ (FIG. 2) of the emergent light L2 output from the light emergent surface S2 is 0° or more to 90° or less.

While the following description is made in connection with the case where the light emergence direction is upward, the optical layout is not limited to such an example. The light emergence direction may be changed depending on, e.g., the light incidence (input) direction and the installed orientation of the optical element.

As illustrated in FIG. 3, it is defined that a length of the reflecting surface 151r in the X-axis direction is d, an array pitch of the reflecting surfaces 151r is p, and an angle formed between a projection of the light impinging on the reflecting surface 151r to the XZ-plane and the X-axis is β. Further, in the following description, an angle formed between a contour line of the reflecting surface 151r in its XZ-section and the projection of the light impinging on the reflecting surface 151r to the XZ-plane is called an "irradiation angle" where necessary. When the reflecting surface 151r has a curvature, the angle β is given by drawing a tangential line with respect to the contour line of the reflecting surface 151r in its XZ-section, and by taking an angle formed between the tangential line and the projection of the light impinging on the reflecting surface 151r to the XZ-plane. In the example illustrated in FIG. 3, the angle β corresponds to the irradiation angle. Herein, the incident light L1 is totally reflected at the reflecting surface 151r when the following formula (1) is satisfied. In the example illustrated in FIG. 3, the incident light impinging on the reflecting surface 151r at the irradiation angle β is all output upwards at the angle β.

$$d = (2n-1)\frac{p}{\tan\beta} (n \in N) \qquad (1)$$

In the formula (1), n is a natural number and represents the number of total reflections of the incident light L1 at the same reflecting surface 151r.

In the optical element 1 according to the embodiment, the length d of the reflecting surface 151r in the X-axis direction and the array pitch p of the reflecting surfaces 151r are set to satisfy the formula (1) at any value of the irradiation angle β within a predetermined angle range. The angle satisfying the formula (1) will be referred to as a "setting irradiation angle" hereinafter.

In the formula (1), the amount of the emergent light L2 output upwards can be replaced with an output width T of the emergent light L2 as illustrated in FIG. 3. With such a replacement, the amount (T(β)) of the emergent light L2 is expressed by the following formula (2) using the angle β formed between the incident light L1 and the X-axis in the XZ-plane and the array pitch p of the reflecting surfaces 151r:

$$T(\beta) = \frac{p}{\tan\beta} \qquad (2)$$

Figure 4:
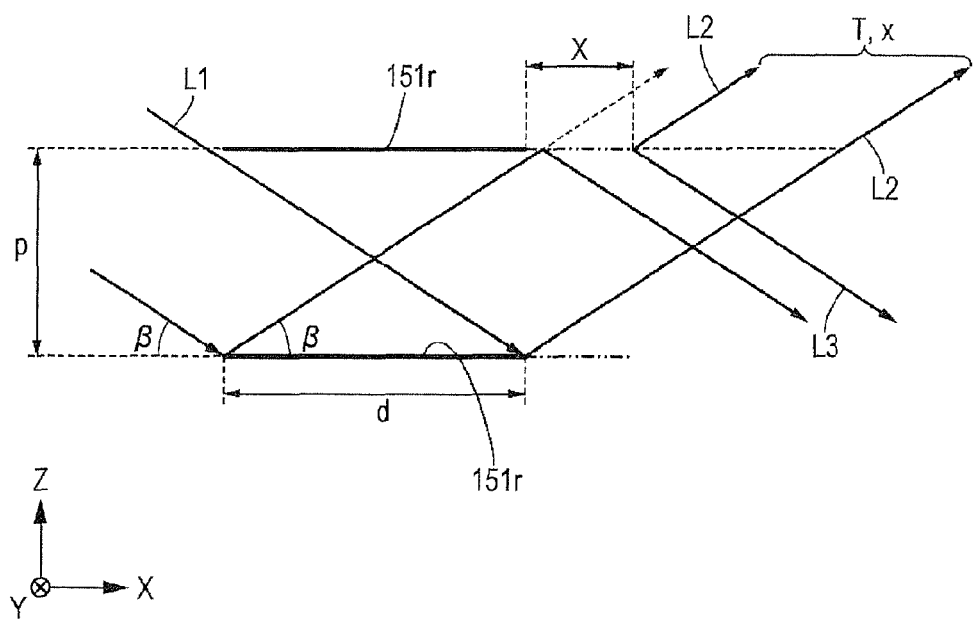
FIG. 4 is an illustration to explain a variation in the amount of emergent light output upwards depending on dimensional change of the reflecting surface.

On the other hand, when the incident light L1 impinges on the reflecting surface 151r at an angle differing from the setting irradiation angle, the amount of the emergent light L2 output upwards is reduced. When considering the amount of the emergent light, change in the irradiation angle with respect to the reflecting surface 151r can be regarded as change in the length d of the reflecting surface 151r in the X-axis direction. FIG. 4 is an illustration to explain a variation in the amount of light output upwards when the length of the reflecting surface 151r in the X-axis direction is increased by x. As seen from FIG. 4, the amount (T(x)) of emergent light output upwards when the length of the reflecting surface 151r in the X-axis direction is increased by x is expressed by the following formula (3):

$$T(x) = \frac{p}{\tan\beta} - x \qquad (3)$$

An increase of the length of the reflecting surface 151r in the X-axis direction causes multiple reflections of light between the adjacent reflecting surfaces, thereby increasing light L3 reflected downwards. In the example illustrated in FIG. 4, therefore, a ratio of the emergent light amount (T(x)) to the amount (T((β)) of the emergent light output upwards at the setting irradiation angle is expressed by the following formula (4):

$$T = \left(\frac{p}{\tan\beta} - x\right) / \frac{p}{\tan\beta} \qquad (4)$$
$$= \left(1 - \frac{\tan\beta}{p}x\right)$$

As described above, the amount of light reflected by the reflecting surface 151r and output upwards is changed depending on change of the incidence (input) angle from the setting irradiation angle, and the emergent light amount is reduced in a larger amount at a larger change from the setting irradiation angle. Accordingly, the setting irradiation angle is optionally set depending on the use and the range of irradiation angle of the light impinging on the reflecting surface 151r, taking into consideration an output loss caused by the change from the setting irradiation angle. Further, the setting irradiation angle is optimized depending on the amount of light to be output upwards. For example, when the optical element 1 is used as a sunlight collector, the setting irradiation angle can be set depending on, e.g., the range of incidence angle of the sunlight in a local region, a season or a time zone where the collected light is utilized, and the illumination range of the emergent light having been collected.

In one embodiment, the reflecting surface 151r is formed such that the setting irradiation angle falls within the range of, for example, 6.5° or more to 87.5° or less. A lower limit of the range, i.e., 6.5°, corresponds to the altitude of the sun at the winter solstice in northern Europe (e.g., at Oslo in Norway), and an upper limit of the range, i.e., 87.5°, corresponds to the altitude of the sun at the summer solstice at Naha in Okinawa (Japan). For example, the setting irradiation angle is set to about 60°. With such setting, the optical element 1 can efficiently take in the sunlight throughout the year in any region over the world. Further, the optical element 1 can greatly contribute to reducing electric power consumed by an illumination device in the daytime. The length d of the reflecting surface 151r in the X-axis direction and the array pitch p of the reflecting surfaces 151r can be set as appropriate depending on the thickness (dimension in the X-axis direction) of the optical element 1. The length d and the array pitch p are optimized, for example, in respective ranges of d=10 to 1000 μm and p=100 to 800 μm.

An aperture ratio of the structure layer 13 will be described below.

Figure 5:
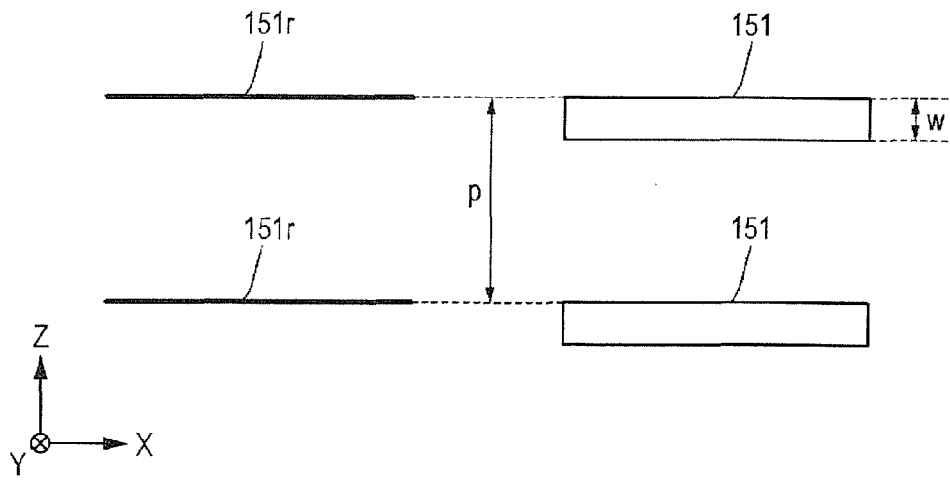
FIG. 5 is an illustration to explain the relationship between a thickness of the reflecting surface (width of a space (gap)) and an array pitch of the reflecting surfaces.

The reflecting surfaces 151r arranged as illustrated in FIG. 2 are each formed as a surface defining the space 151 that has a width w in the Z-axis direction. Accordingly, the substantial array pitch of the reflecting surfaces 151r in the optical element 1 according to the embodiment is affected by a value of the width w of the space 151. FIG. 5 illustrates the relationship between the array pitch p of the reflecting surfaces 151r and the width w of the space 151. As illustrated in FIG. 5, an effective array pitch of the reflecting surfaces 151r is expressed by the following formula (5):

$$AR = \frac{p - w}{p} \qquad (5)$$

Figure 6:
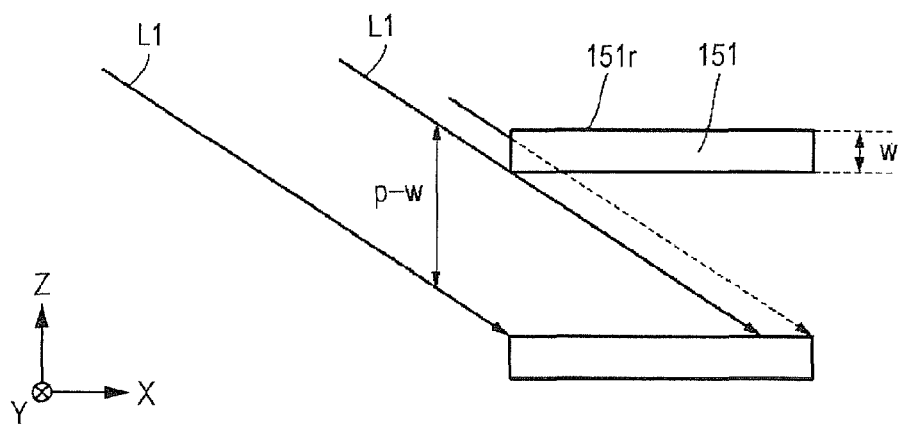
FIG. 6 is an illustration to explain a variation in the amount of emergent light output upwards depending on the thickness of the reflecting surface (width of the space)

In the formula (5), AR represents the aperture ratio of the structure layer 15. When the aperture ratio is small, an output proportion of the incident light is reduced and visibility through the optical element is significantly degraded. FIG. 6 is an illustration to explain a reduction in the output amount of the incident light L1 depending on the width w of the space 151. As illustrated in FIG. 6, the incident light L1 going to impinge on the reflecting surface 151r is intercepted by an amount corresponding to the width w of the space 151. Accordingly, in consideration of the width w of the space 151, the amount of the incident light L1 impinging on the reflecting surface 151r is expressed by the above-mentioned formula (5). By combining the formula (5) with the above-mentioned formula (4), a proportion of the component of the incident light L1, which is output upwards, is expressed by the following formula (6):

$$T = \left(1 - \frac{\tan\beta}{p}x\right)\left(\frac{p - w}{p}\right) \qquad (6)$$

In the embodiment, the width w of the space 151 is set to, e.g., 0.1 μm or more, and an upper limit of the width w is determined, for example, depending on a value of the array pitch p of the reflecting surfaces 151r. Further, the aperture ratio AR of the structure layer 15 is set to 0.2 or more so that the light output upwards can be effectively taken out.

Method of Manufacturing Optical Element

Figure 7A:
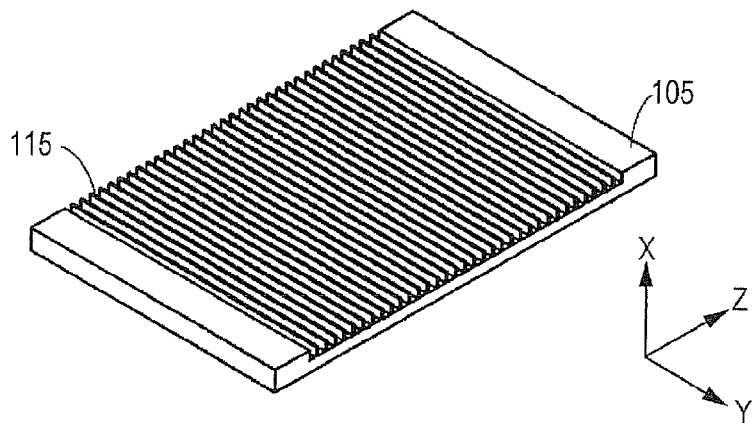
FIGS. 7A to 7C are perspective views illustrating primary steps of one example of a method of manufacturing the optical element.
Figure 7B:
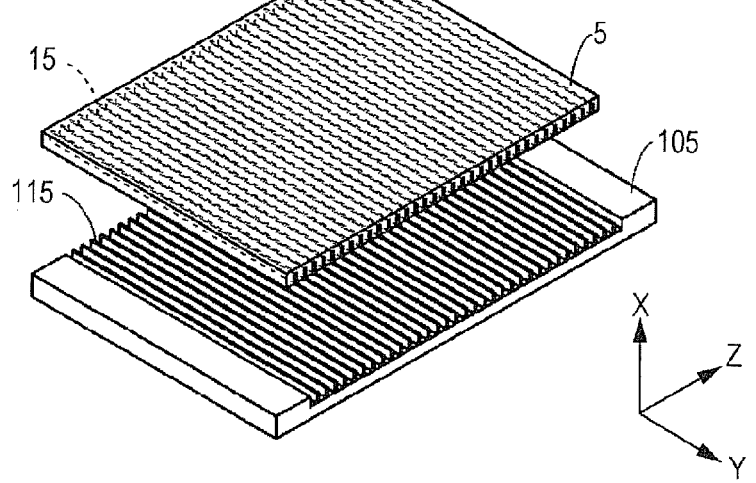
Figure 7C:
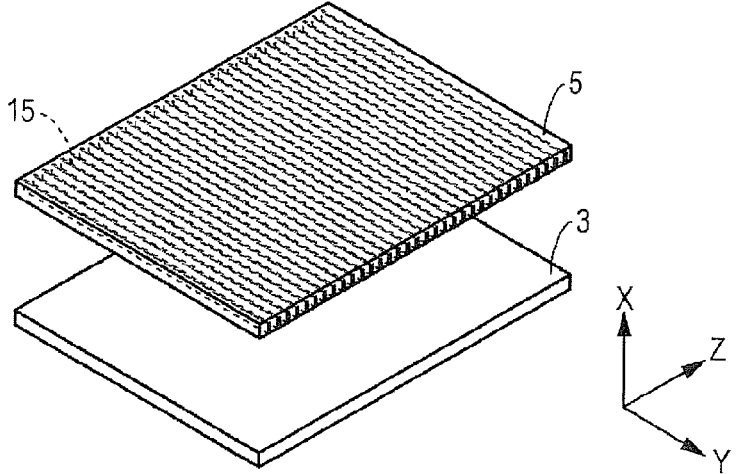

A method of manufacturing the optical element 1 having the above-described construction will be described below. FIGS. 7A to 7C are perspective views illustrating primary steps of one example of the method of manufacturing the optical element 1 according to the embodiment.

First, as illustrated in FIG. 7A, a master 105 used for fabricating the second light transmissive layer 5 is prepared. The master 105 is constituted as a metal die or a resin die, for example. A concave-convex shape 115 corresponding to the shape of the structure layer 15 is formed in one surface of the master 105. Then, as illustrated in FIG. 7B, the second light transmissive layer 5 having the structure layer 15 is formed by transferring the concave-convex shape 115 of the master 105 to a transfer material.

The transfer material can be, for example, an energy-ray curable resin composition, or a resin sheet or a resin film including an energy-ray curable resin composition coated thereon. The energy-ray curable resin composition is preferably an ultraviolet curable resin.

In more detail, when the ultraviolet curable resin is used as the material of the second light transmissive layer 5, the second light transmissive layer 5 is fabricated by irradiating the ultraviolet curable resin, which is in a state sandwiched between the base 11 and the master 105, with an ultraviolet ray through the base 11, for example. In such a case, the base 11 is preferably made of a resin material, such as PET, which has good transparency to an ultraviolet ray.

Further, the second light transmissive layer 5 may be continuously fabricated in a roll-to-roll manner. In such a case, the master 105 can be formed in the shape of a roll, and the concave-convex shape of the master 105 can be transferred to a transfer material by using a transfer process.

The transfer process can be practiced, for example, as a method of supplying a belt-like resin sheet from a roll and transferring the shape of a die to the belt-like resin sheet under application of heat and pressure (called a laminating transfer process). As another example, the transfer process can be practiced as a method of coating an energy-ray curable resin composition, which is in a state not yet cured, over a belt-like resin film and irradiating the energy-ray curable resin composition, which is in a state nipped between the belt-like resin film and a roll-shaped master, with an energy ray, thereby curing the energy-ray curable resin composition. Examples of the energy ray usable here include an electron ray, an ultraviolet ray, a visible ray, a gamma ray, and an electron ray. The ultraviolet ray is preferable from the viewpoint of production equipment.

Next, as illustrated in FIG. 7C, the second light transmissive layer 5 is bonded to the first light transmissive layer 3 with, for example, the bonding layer 7 interposed therebetween. As a result, the optical element 1 illustrated in FIG. 2 is fabricated. The first light transmissive layer 3 and the second light transmissive layer 5 may be bonded by welding both the layers to each other under application of heat and pressure or with the use of a chemical solvent.

According to the above-described manufacturing method, the optical element 1 including the structure layer 15 can be easily fabricated. Further, the thickness of the optical element 1 can be easily reduced to a value of 25 μm to 2500 μm, for example, without making the concave-convex shape of the master complicated. Moreover, since the base 11 is stacked to the second light transmissive layer 5, the optical element can be given with appropriate rigidity, whereby easiness in handling and durability can be improved.

The optical element 1 fabricated as described above is usually employed by being affixed to the window member F, but it may be used alone. According to the embodiment, the incident light impinging on each reflecting surface 151r in the structure layer 15 from above within the predetermined angle range can be output upwards from the light emergent surface S2 with high efficiency. Thus, the sunlight can be efficiently taken in toward the ceiling of a room by using the optical element 1 as a sunlight collector.

A distribution of the emergent light from the optical element can be controlled by forming the structure layer inside the optical element as described above. On that occasion, if the shape of the structure layer is deviated (deformed) from the shape as per design values, expected optical characteristics are not satisfied in many cases. In view of such a situation, the inventors have conducted intensive studies and have succeeded in designing the structure layer in a way satisfying predetermined relational formulae to obtain the expected optical characteristics by classifying the deviations of the shape of the structure layer and by quantitatively evaluating the relationships between the deviations of the shape of the structure layer and the optical characteristics.

The following three factors regarding the deviations of the shape of the structure layer from the shape as per design values adversely affect the optical characteristics of the optical element 1:
  Tilting and/or curving in the shape of the structure layer
  Shape of a distal end of a structure unit constituting the structure layer
  Roughness of the surface of the structure layer Those factors are generated for the reasons in the manufacturing process, for example, and it is difficult to completely prevent the occurrence of those factors. Therefore, specifying an allowable range for the deviation is one effective method for obtaining the expected optical characteristics.

The optical element according to the first embodiment relates to an optical element which can suppress a reduction of the amount of the emergent light output upwards even when the shape of the structure layer includes tilting and/or curving. In the following description, a proportion of a component of the light, which is incident on the optical element and is output upwards with respect to the optical element, is called an "upward transmittance".

Figure 8A:
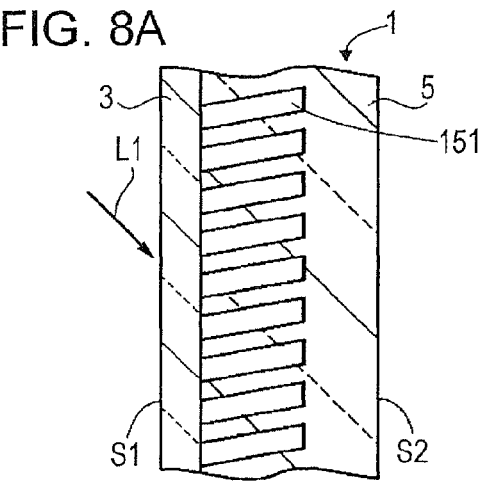
FIGS. 8A to 8F are schematic sectional views illustrating examples of tilting and curving of the shape of a structure layer.
Figure 8B:
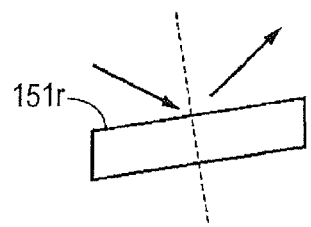
Figure 8C:
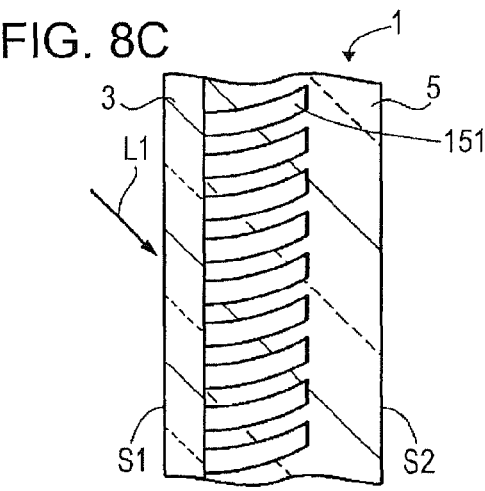
Figure 8D:
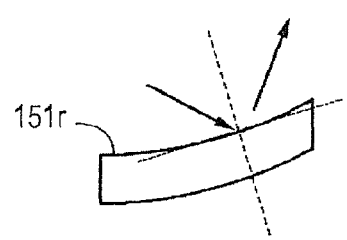
Figure 8E:
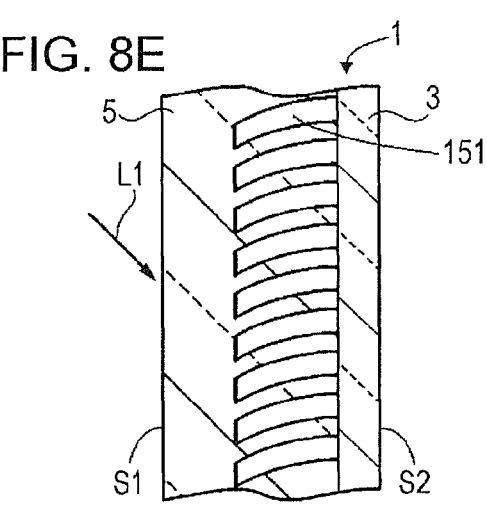
Figure 8F:
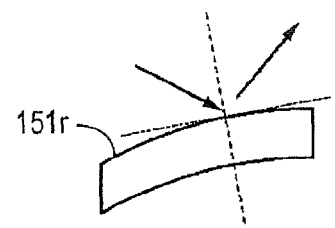
Figure 9A:
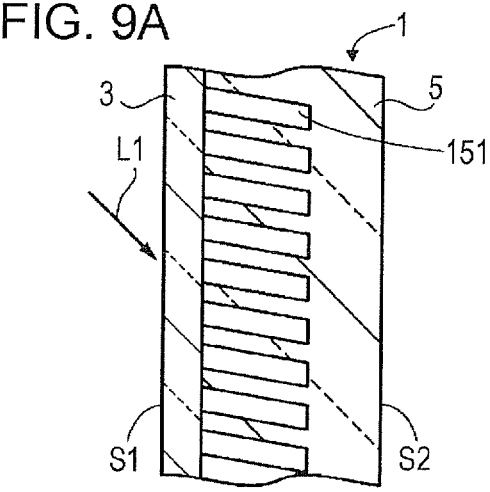
FIGS. 9A to 9F are schematic sectional views illustrating examples of tilting and curving of the shape of the structure layer.
Figure 9B:
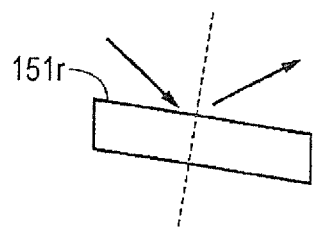
Figure 9C:
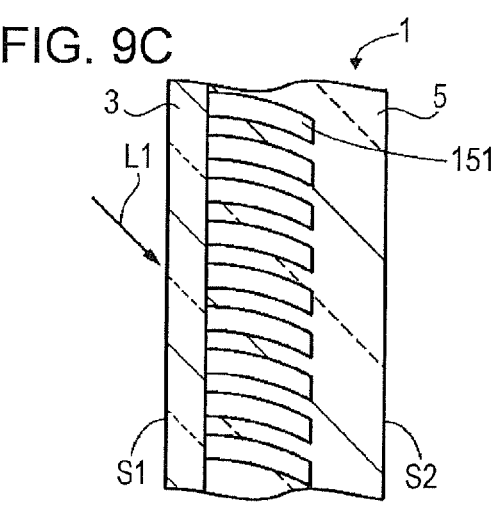
Figure 9D:
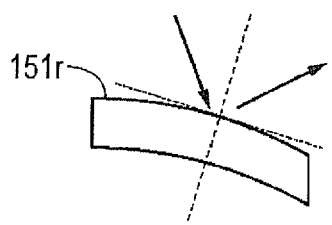
Figure 9E:
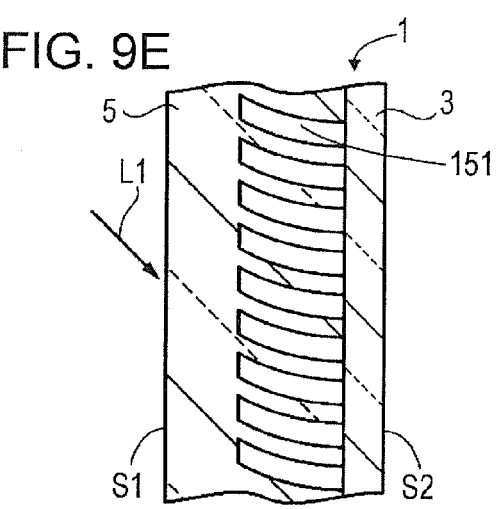
Figure 9F:
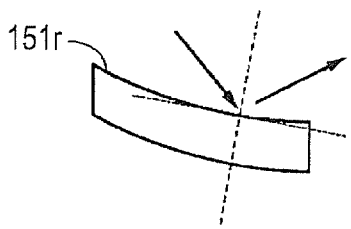

FIGS. 8A to 8F and FIGS. 9A to 9F are schematic sectional views illustrating examples of tilting and curving of the shape of the structure layer. In FIGS. 8A to 8F and FIGS. 9A to 9F, the bonding layer 7 and the base 11 are omitted. FIGS. 8A, 8C and 8E illustrate examples in which the space 151 is inclined upwards toward the emergent side. FIGS. 8B, 8D and 8F illustrate how the incident light is reflected by the reflecting surface 151r in the respective examples of FIGS. 8A, 8C and 8E. In each of the examples illustrated in FIGS. 8C and 8E, the reflecting surface 151r has a certain curvature. FIGS. 9A, 9C and 9E illustrate examples in which the space 151 is inclined downwards toward the emergent side. FIGS. 9B, 9D and 9F illustrate how the incident light is reflected by the reflecting surface 151r in the respective examples of FIGS. 9A, 9C and 9E. In each of the examples illustrated in FIGS. 9C and 9E, the reflecting surface 151r has a certain curvature. While FIGS. 8A to 8F and FIGS. 9A to 9F illustrate the examples in each of which the space 151 has such a cross-sectional shape that opposing sides of the cross-sectional shape are substantially parallel to each other, the cross-sectional shape of the space 151 is not limited to the illustrated one. For example, the cross-sectional shape of the space 151 may be variously modified into, e.g., a shape having a curvature only in one side, or a shape having opposing sides that are expanded outwards in oppositely away directions.

The following description is made with attention focused on the shape of the reflecting surface 151r. It is premised that, in the following description, the difference in refractive index between the first light transmissive layer 3 and the second light transmissive layer 5 is as small as negligible. Also, even when the bonding layer 7 and the base 11 are present at any position inside the optical element 1, the difference in refractive index between the first light transmissive layer 3 and the second light transmissive layer 5 is premised to be as small as negligible.

The incident light L1 entering the optical element 1 is refracted at the light incident surface S1 and is reflected by the reflecting surface 151r. The light reflected by the reflecting surface 151r is refracted at the light emergent surface S2 and is output to the outside of the optical element 1. When the structure layer 15 includes tilting and/or curving, the irradiation angle with respect to the reflecting surface 151r is deviated from the design value, and the amount of light output upwards from the optical element 1 is changed. On that occasion, the amount of light output upwards is changed in different ways depending on whether the space 151 is inclined upwards or downwards towards the emergent side.

Upward Inclination Towards Emergent Side

When the reflecting surface 151r is inclined upwards toward the emergent side as illustrated in FIGS. 8A to 8F, an impingement angle with respect to the light emergent surface S2, at which the light impinges on the light emergent surface S2 after being reflected by the reflecting surface 151r, is deviated from the design value. Therefore, unintended total reflection is caused at the light emergent surface S2 and the upward transmittance is reduced.

Figure 10:
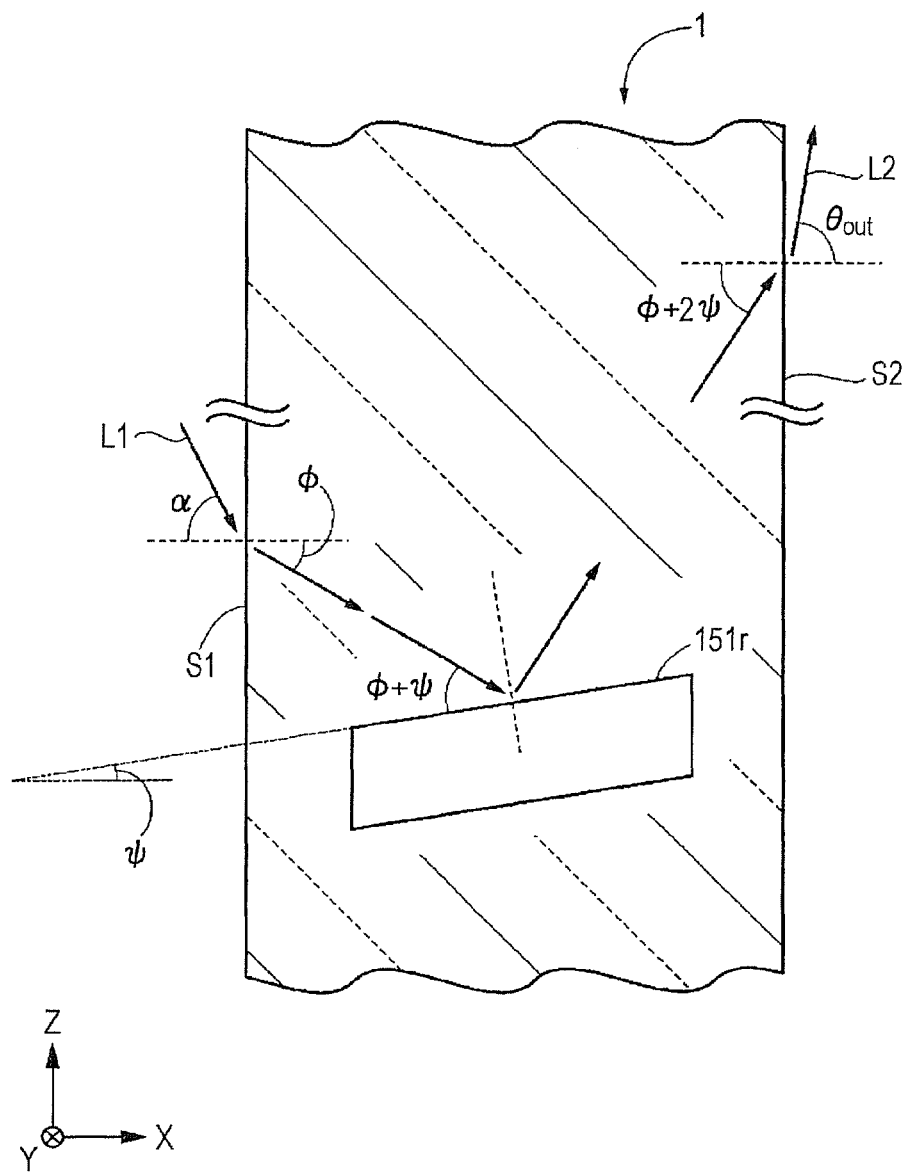
FIG. 10 is a schematic sectional view of principal part, the view illustrating how light propagates through the interior of the optical element when the reflecting surface is inclined upwards to the emergent (output) side.

FIG. 10 is a schematic sectional view of principal part, the view illustrating how light propagates through the interior of the optical element when the reflecting surface is inclined upwards toward the emergent side. In an example illustrated in FIG. 10, the reflecting surface 151r is inclined upwards by an angle ψ with respect to the X-axis. The angle w will be also referred to as an "inclination angle" hereinafter.

As illustrated in FIG. 10, the incident light L1 entering the optical element 1 at an incidence angle α is refracted at the light incident surface S1. A refraction angle at that time is defined as ϕ. The light propagating through the interior of the optical element 1 impinges on the reflecting surface 151r at the irradiation angle (ϕ+ψ) and advances to the light emergent surface S2 after being reflected by the reflecting surface 151r. The light reaching the light emergent surface S2 is refracted at the light emergent surface S2 and is output as the emergent light L2 to the outside. At that time, an angle at which the light impinges on the light emergent surface S2 is (ϕ+2ψ).

For suppressing a reduction of the component of the light output to the outside of the optical element 1, it is effective to prevent total reflection at the light emergent surface S2. Because the angle at which the light impinges on the light emergent surface S2 is (ϕ+2ψ), a critical angle for the total reflection at the light emergent surface S2 depends on the inclination angle ψ.

Given that the refractive index of air is $n_{air}$ and the refractive index of the interior of the optical element 1 is $n_p$, the following formula (7) is held at the light incident surface S1. Further, given that an emergence (output) angle of the emergent light L2 from the light emergent surface S2 is $θ_{out}$, a condition for preventing the total reflection at the light emergent surface S2 is expressed by the following formula (8).

$$n_{air} \sin α = n_p \sin ϕ \quad (7)$$

$$n_p \sin(ϕ+2ψ) \leq n_{air} \quad (8)$$

From the formulae (7) and (8), the following formula (9) is obtained.

$$(n_p + n_{air} \sin α)(n_p - n_{air} \sin α)\sin^2 2ψ \leq n_{air}^2 (1 - \cos 2ψ \sin α)^2 \quad (9)$$

Accordingly, the total reflection at the light emergent surface S2 can be prevented and the reduction of the upward transmittance can be suppressed by designing the optical element 1 to satisfy the formula (9) even when the shape of the structure layer is tilted.

Be it noted that the formula (9) is further applicable to the case where the sectional shape of the space 151 is curved. In such a case, the angle ψ is provided as an angle formed between the X-axis and one of tangential lines drawn to the contour line of the reflecting surface 151r in its XZ-section, which one has a maximum inclination with respect to the X-axis.

Downward Inclination Toward Emergent Side

As illustrated in FIGS. 9A to 9F, when the reflecting surface 151r is inclined downwards toward the emergent side, the reflection at the reflecting surface 151r is affected in a similar manner to that in the case where the area contributing to the reflection is reduced. For example, the incident light input from a direction forming a very small angle with respect to the X-axis is not reflected by the reflecting surface 151r. Therefore, the amount of light reflected by the reflecting surface 151r is reduced, and a component of the light corresponding to the reduction in the amount of the reflected light is output downwards with respect to the optical element 1.

Figure 11A:
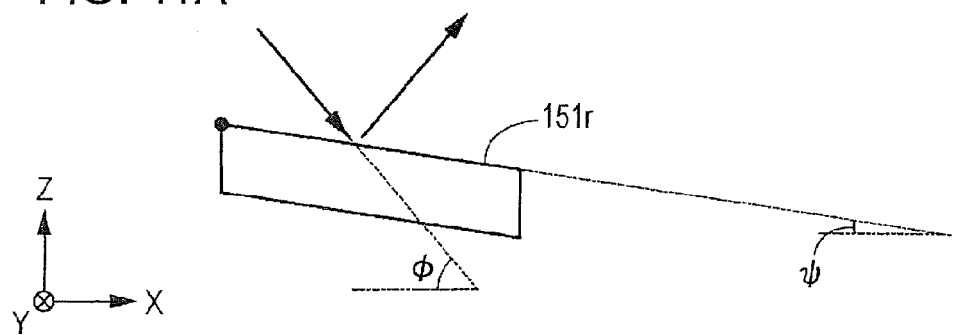
FIGS. 11A to 11C are schematic partial sectional views each illustrating a region in the vicinity of the space when the reflecting surface is inclined downwards to the emergent side.
Figure 11B:
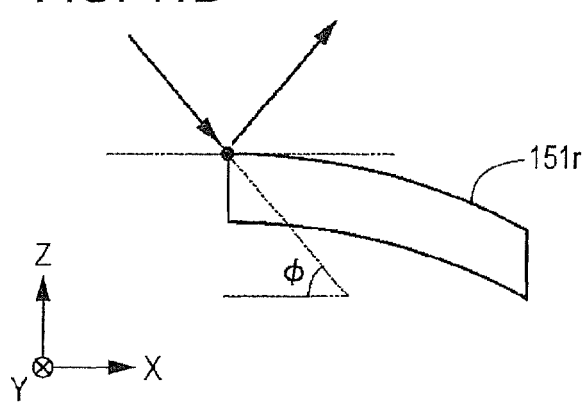
Figure 11C:
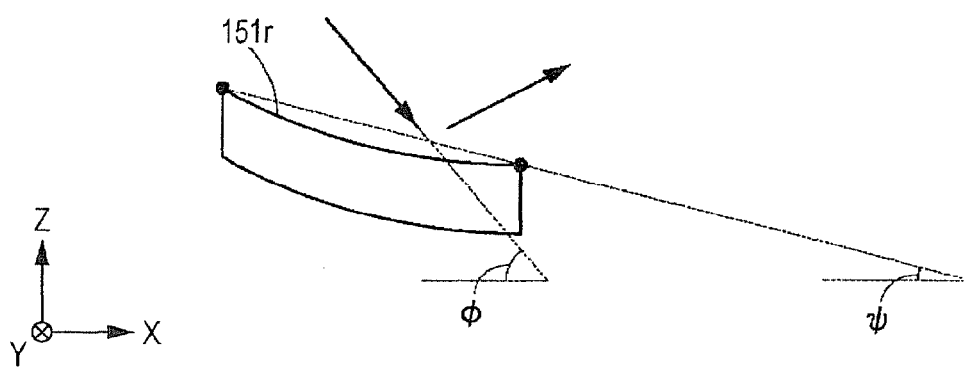

FIGS. 11A to 11C are schematic partial sectional views each illustrating a region in the vicinity of the space when the reflecting surface is inclined downwards toward the emergent side. In an example illustrated in FIG. 11A, the reflecting surface 151r is inclined downwards by the angle ψ with respect to the X-axis. In an example illustrated in FIG. 11B, the reflecting surface 151r is entirely inclined downwards while it is curved to be convex upwards with a certain curvature. In an example illustrated in FIG. 11C, a linear line connecting both ends of the reflecting surface 151r on the light incident side and the light emergent side is inclined by the angle ψ with respect to the X-axis when viewed in the XZ-section. Further, in FIGS. 11A to 11C, an angle formed between the light impinging on the reflecting surface 151r and the X-axis is defined as ϕ.

The case of FIGS. 11A and 11B and the case of FIG. 11C will be separately discussed below. In the case of FIGS. 11A and 11B, an inclination of a tangential line at the end of the reflecting surface 151r on the light incident side is to be smaller than the angle formed between the light impinging on the reflecting surface 151r and the X-axis when viewed in the XZ-section, in order to ensure that the incident light is reflected by the reflecting surface 151r. Stated another way, in the example illustrated in FIG. 11A, the optical element 1 is to be designed such that the inclination angle ψ is smaller than the angle ϕ.

In the case of FIG. 11C, an inclination of the linear line connecting both the ends of the reflecting surface 151r on the light incident side and the light emergent side is to be smaller than the angle formed between the light impinging on the reflecting surface 151r and the X-axis when viewed in the XZ-section, in order to ensure that the incident light is reflected by the reflecting surface 151r. Stated another way, in the example illustrated in FIG. 11C, the optical element 1 is to be designed such that the inclination angle ψ is smaller than the angle ϕ.

Thus, depending on tilting and/or curving in the shape of the structure layer, the optical element 1 is designed such that the inclination of the tangential line at the end of the reflecting surface 151r on the light incident side is smaller than the angle formed between the light impinging on the reflecting surface 151r and the X-axis. Alternatively, the optical element 1 is designed such that the inclination of the linear line connecting both the ends of the reflecting surface 151r on the light incident side and the light emergent side is smaller than the angle formed between the light impinging on the reflecting surface 151r and the X-axis. The first length d can be provided as a length of the contour line of the reflecting surface 151r in the XZ-plane. By designing the optical element as described above, the incident light can be surely reflected at the reflecting surface 151r. In addition, the reduction of the upward transmittance can be suppressed by satisfying the condition that the light reflected by the reflecting surface 151r is not totally reflected at the light emergent surface S2.

As seen from the above discussion, the optical element 1 is to be designed such that the tilting and/or the curving in the shape of the structure layer is held within the range satisfying the foregoing formula (9). In this connection, by regarding the inclination angle ψ as an angle formed between a tangential line at an arbitrary point of the reflecting surface 151r and the X-axis in the XZ-plane, the total reflection at the light emergent surface S2 can be suppressed regardless of whether the space 151 is inclined upwards or downwards toward the emergent side. As a result, the reduction of the upward transmittance can be suppressed even when the shape of the structure layer includes the tilting and/or the curving.

2. SECOND EMBODIMENT

A second embodiment relates to an optical element in which the reduction in the amount of light output upwards with respect to the optical element can be suppressed even when the shape of a distal end of a structure unit forming the structure layer is rounded. Herein, the expression "distal end of a structure unit" implies an apex portion of the structure unit projecting toward the light incident side.

FIGS. 12A to 12C and FIGS. 13A to 13C serve to explain, when the shape of the distal end of the structure unit forming the structure layer is rounded, the influence of the rounding upon the upward transmittance. Simulations were performed by presuming distal end shapes, illustrated in FIGS. 12A to 12C, as examples of the shape of the distal end of the structure unit forming the structure layer. The optical simulation software (Light Tools) available from ORA (Optical Research Associates) was used to perform the simulations. The following description regarding the simulations is made on the premise that the structure layer is not embedded in, e.g., a resin and light enters the optical element from the distal end side of the structure unit.

Figure 12A:
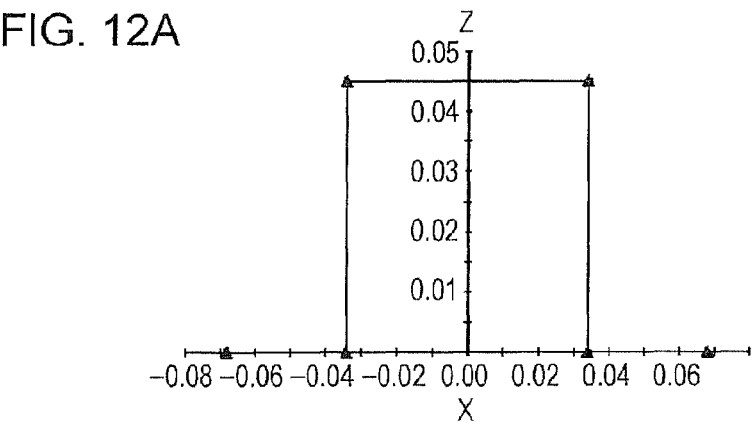
FIGS. 12A to 12C are graphs to explain, when the shape of a distal end of a structure unit forming the structure layer is rounded, the influence of the rounding upon upward transmittance.
Figure 12B:
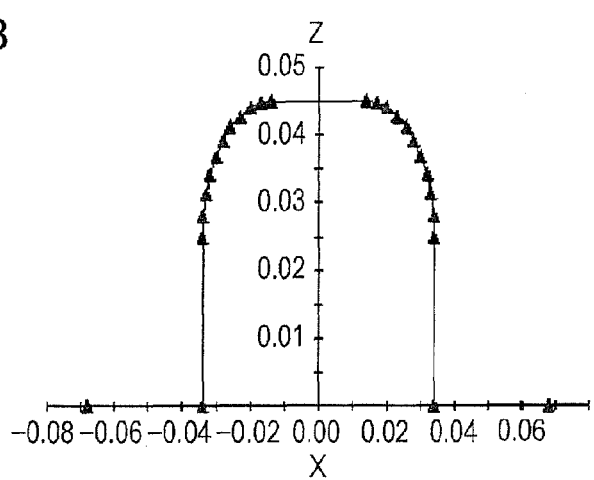
Figure 12C:
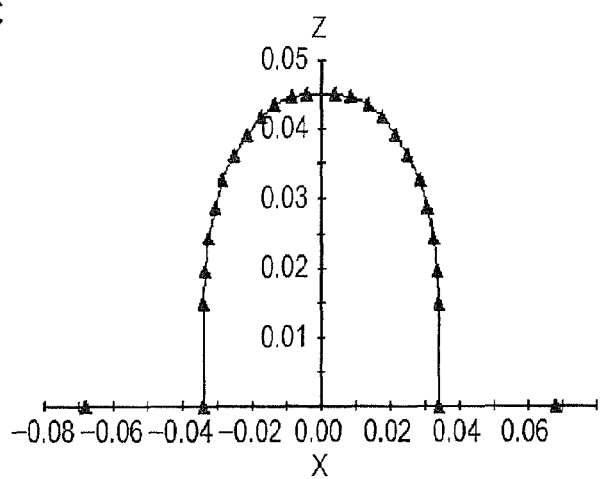
Figure 13A:
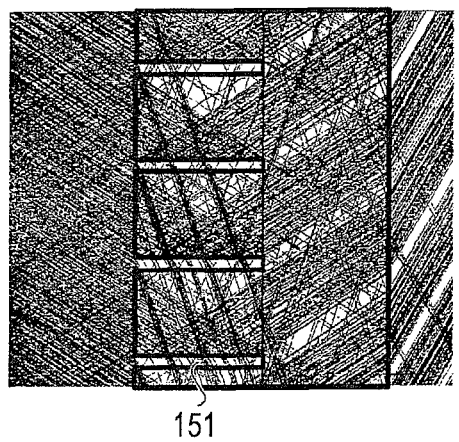
FIGS. 13A to 13C illustrate the simulation results to explain, when the shape of the distal end of the structure unit of the structure layer is rounded, the influence of the rounding upon upward transmittance.
Figure 13B:
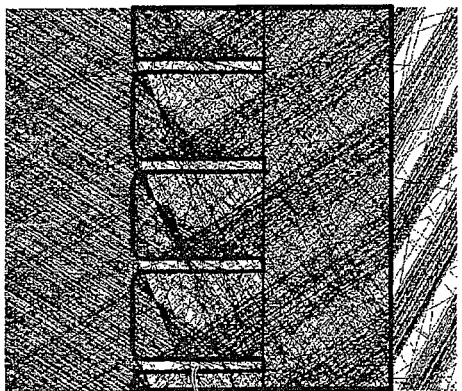
Figure 13C:
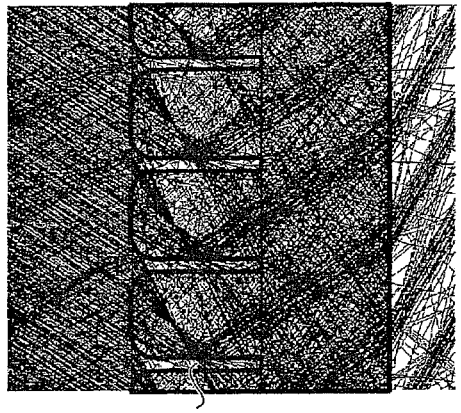

FIGS. 13A to 13C illustrate the simulation results corresponding respectively to the distal end shapes illustrated in FIGS. 12A to 12C. FIG. 13A represents the case where the shape of the distal end of the structure unit is not rounded (i.e., the case where the distal end shape does not have a curvature). FIG. 13B represents the case where the shape of the distal end of the structure unit has a curvature of 0.01, and FIG. 13C represents the case where the shape of the distal end of the structure unit has a curvature of 0.02. As seen from FIGS. 13A to 13C, when the shape of the distal end is rounded, the distal end acts like a lens such that light entering the structure layer is focused at a pseudo focal point and then diverges. Also, it is seen that the amount of light reflected by the reflecting surface 151r as per intended is reduced with the focusing action, thus reducing the upward transmittance. Further, it is seen that the reduction of the upward transmittance is more significant as the shape of the distal end is rounded to a larger extent. Hence, even when the light impinging on the reflecting surface 151r is reflected as divergent light, the influence of the rounding of the distal end shape upon the optical characteristics of the optical element 1 can be reduced by designing the optical element 1 so that most of the divergent light satisfies the condition for the total reflection at the reflecting surface 151r.

Figure 14A:
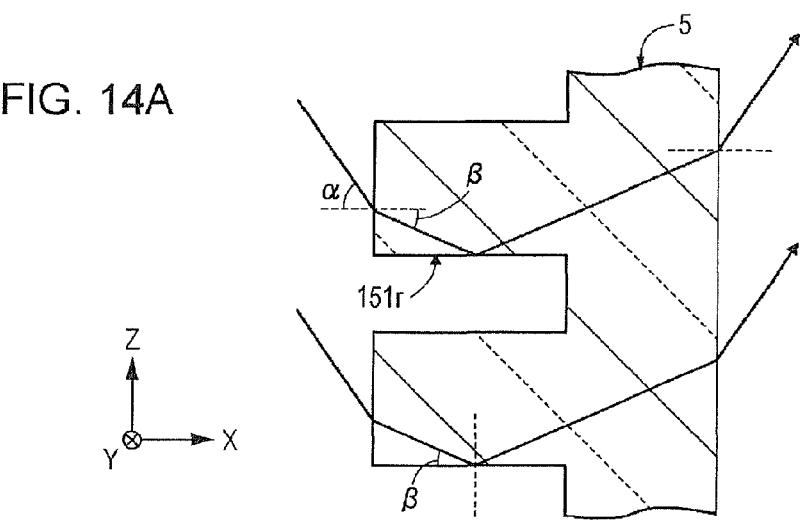
FIGS. 14A to 14C are illustrations to explain the condition at which divergent light is totally reflected by the reflecting surface.
Figure 14B:
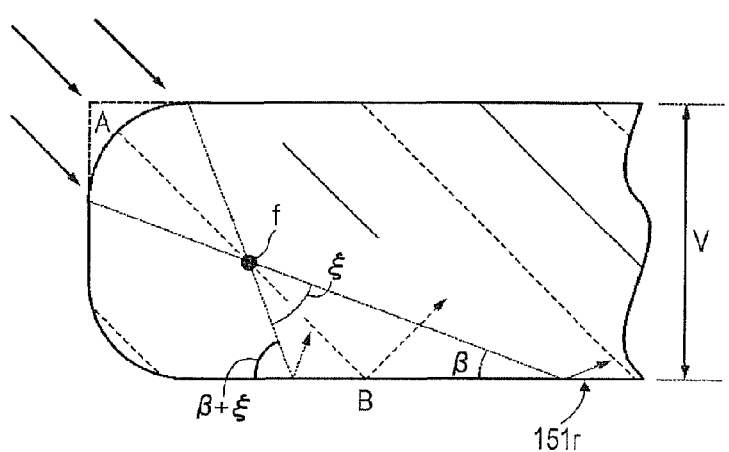
Figure 14C:
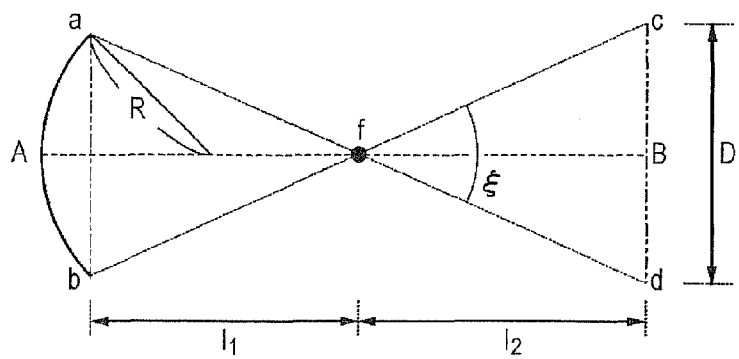

FIGS. 14A to 14C are illustrations to explain the condition for causing the divergent light to be totally reflected by the reflecting surface. FIG. 14A is a schematic sectional view of a part of the structure layer. As illustrated in FIG. 14A, light incident on the distal end of the structure unit forming the structure layer at an incidence angle α is refracted at the incident surface, and the refracted light advances to the reflecting surface 151r. Given that the light is refracted at a refraction angle β, the incidence angle α and the refraction angle β satisfy the following formula (10):

$$n_{air} \sin \alpha = n_p \sin \beta \tag{10}$$

Thus, the light refracted at the incident surface enters the reflecting surface 151r at the irradiation angle β. Total reflection occurs at the reflecting surface 151r when the irradiation angle β satisfies the following formula (11):

$$\beta \leq \text{Arccos}\left(-\frac{n_{air}}{n_p}\right) \tag{11}$$

FIG. 14B is a schematic sectional view of the distal end of the structure unit forming the structure layer. It is here premised that the distal end of the structure unit has a width V in the Z-axis (second direction) and the shape of the distal end is rounded in the form of a circular arc having the radius R. Also, it is premised that the focal point is f when the rounded portion is regarded as a lens, and an imaginary optical axis intersects the structure unit at points A and B. Given that divergence of the light diverging after being focused at the focal point f is expressed by ξ, the irradiation angle with respect to the reflecting surface 151r is in the range of β to (β+ξ). In the following description, the divergence ξ of the divergent light is referred to as a "divergent angle ξ" for the convenience of explanation.

Consider now the relationship between the divergent angle ξ and the shape of the structure unit. As illustrated in FIG. 14C, end points of the circular arc are denoted by a and b, and the distance from a point at which a linear line connecting the points a and b intersects an imaginary optical axis AB to the focal point f is denoted by $l_1$. The distance from the focal point f to the point B is denoted by $l_2$. A point at which a linear line drawn perpendicularly to the imaginary optical axis AB while passing the point B intersects a linear line connecting the point a and the focal point f is denoted by d. A point at which a linear line drawn perpendicularly to the imaginary optical axis AB while passing the point B intersects a linear line connecting the point b and the focal point f is denoted by c. On those definitions, a distance D between the points c and d can be considered as representing a degree of light divergence when the rounded portion in the shape of the distal end is regarded as a lens.

Because a triangle abf and a triangle dcf are similar to each other, the following formula (12) is held:

$$\frac{\sqrt{2}R}{D} = \frac{l_1}{l_2} \tag{12}$$

Here, the distance $l_2$ from the focal point f to the point B satisfies the following formula (13):

$$l_2 = \overline{AB} - \left\{l_1 + R\left(1 - \frac{\sqrt{2}}{2}\right)\right\} \tag{13}$$

$$= \sqrt{2}V - l_1 - R\left(1 - \frac{\sqrt{2}}{2}\right)$$

From the formulae (12) and (13), the degree D of light divergence is expressed by the following formula (14) using the radius R of the circular arc aAb, the distance $l_1$, and the width V of the distal end of the structure unit in the Z-direction:

$$D = \sqrt{2}R\left\{\frac{\sqrt{2}V}{l_1} - 1 - \frac{R}{l_1}\left(1 - \frac{\sqrt{2}}{2}\right)\right\} \tag{14}$$

Accordingly, the divergent angle ξ of the light after being focused is expressed by the following formula (15) using the degree D of light divergence in the formula (14):

$$\xi = 2\text{Arctan}\left(\frac{D}{2l_2}\right) \tag{15}$$

Here, the condition for causing the light impinging on the reflecting surface 151r at the irradiation angle β to be totally reflected by the reflecting surface 151r is expressed by the foregoing formula (11). Further, when the rounded portion in the shape of the distal end is regarded as a lens, the irradiation angle of the light diverging after being focused is in the range of β to (β+ξ) with respect to the reflecting surface 151r. Therefore, it is understood that the condition for causing the divergent light to be totally reflected by the reflecting surface 151r can be expressed by the following formula (16):

$$(\beta + \xi) \le \text{Arccos}\left(-\frac{n_{air}}{n_p}\right) \quad (16)$$

From the formulae (10) and (11), the incidence angle α is desirably within the range expressed by the following formula (17):

$$\alpha \le \text{Arcsin}\left(\frac{n_p}{n_{air}}\right)\sin\left(\text{Arccos}\left(-\frac{n_{air}}{n_p}\right)\right) \quad (17)$$

Thus, the optical element 1 is to be designed such that the condition expressed by the formula (17) is satisfied under the condition expressed by the formula (16). By designing the optical element 1 in such a manner, the reduction of the upward transmittance in the optical element 1, which is attributable to the rounding of the distal end shape, can be reduced.

Optical Compensation for Rounding of Distal End Shape

The optical element according to the second embodiment can also be formed, as described above with reference to FIG. 7, by bonding one light transmissive layer (second light transmissive layer 5), to which the concave-convex shape of the master has been transferred, to the other light transmissive layer (first light transmissive layer 3). In other words, the bonding layer is arranged on the distal end side of the structure unit forming the structure layer. Therefore, the influence of the rounding of the distal end shape upon the upward transmittance can be reduced by improving the step of bonding the distal end of the structure unit forming the second light transmissive layer, to which the concave-convex shape of the master has been transferred, to the first light transmissive layer.

Figure 15A:
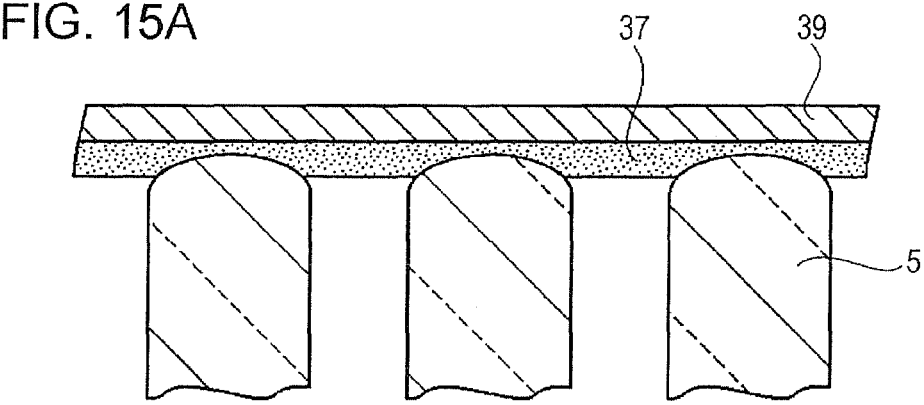
FIGS. 15A to 15C are illustrations to explain examples of a method for reducing the influence upon upward transmittance, which is caused by the rounding of the shape of the distal end of the structure unit.
Figure 15B:
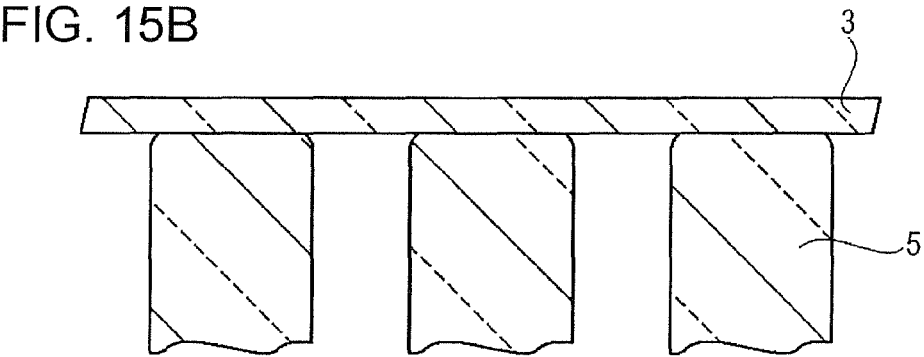
Figure 15C:
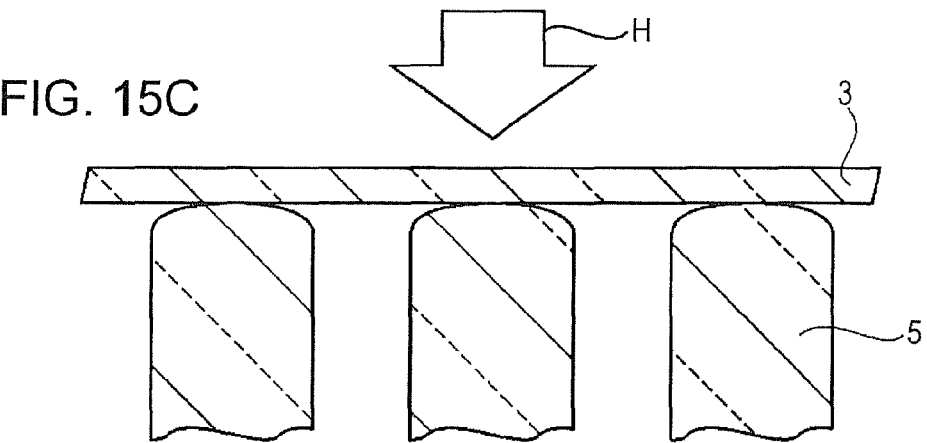

FIGS. 15A to 15C are illustrations to explain examples of a method for reducing the influence upon the upward transmittance, which is caused by the rounding of the shape of the distal end of the structure unit. FIGS. 15A to 15C correspond respectively to first to third methods for reducing the influence upon the upward transmittance.

According to the first method for reducing the influence upon the upward transmittance, the distal end of the structure unit and the first light transmissive layer are joined to each other with a bond or an adhesive interposed therebetween in such a state that at least a part of the distal end of the structure unit is embedded in a joining layer made of the bond or the adhesive. Thus, the divergence of light caused by the rounded portion of the distal end of the structure unit can be reduced by, as illustrated in FIG. 15A, embedding the rounded portion of the distal end of the structure unit in the joining layer 37. In the example illustrated in FIG. 15A, because the bond or the adhesive is previously formed on one surface of a separator 39, the distal end of the structure unit can be embedded in the joining layer 37 by applying pressure to the joining layer 37 through the separator 39. Alternatively, the distal end of the structure unit may be embedded in the joining layer 37 by peeling off the separator 39 after attaching the distal end of the structure unit to the joining layer 37, and by applying pressure when the distal end of the structure unit and the first light transmissive layer are joined to each other with the joining layer 37 interposed therebetween. In any of the above-mentioned cases, the difference in refractive index between the material of the joining layer 37 and the material of the distal end of the structure unit forming the structure layer is preferably as small as possible.

According to the second method for reducing the influence upon the upward transmittance, a surface layer portion of the distal end of the structure unit is processed to be swollen by a chemical solvent, and the distal end of the structure unit and the first light transmissive layer 3 are joined to each other under application of pressure. Thus, as illustrated in FIG. 15B, the distal end of the structure unit, which has been swollen by the chemical solvent, is press-bonded to the first light transmissive layer 3. As a result, the rounded shape of the distal end of the structure unit is made closer to the shape as per the design values such that the parameters fall within the allowable ranges in design, which are obtained through the above-described procedures, for example.

The chemical solvent employed in the second method may be any type of solvent as long as, in basic properties, the chemical solvent is able to dissolve the resin used. For example, the chemical solvent can be optionally selected from among ketone-based solvents such as acetone, methylethylketone, and cyclohexanon, aromatic-based solvents such as toluene and xylene, ester-based solvents such as methyl acetate and ethyl acetate, and hydrocarbon-based solvents (including linear, cyclic, and heterocyclic hydrocarbons, e.g., N-methylpyrrolidone). It is preferable to employ the chemical solvent having a dissolution parameter close to that of the resin used.

According to the third method for reducing the influence upon the upward transmittance, the distal end of the structure unit and the first light transmissive layer 3 are joined to each other under application of heat and pressure to the distal end of the structure unit. Thus, by press-bonding the distal end of the structure unit to the first light transmissive layer 3 under application of heat H through the first light transmissive layer 3 as illustrated in FIG. 15C, the rounded shape of the distal end of the structure unit is made closer to the shape as per the design values such that the parameters fall within the allowable ranges in design, which are obtained through the above-described procedures, for example. As a result, a proportion of the rounded portion in the distal end of the structure unit can be reduced and the divergence of light caused by the rounded portion of the distal end of the structure unit can also be reduced.

Figure 16A:
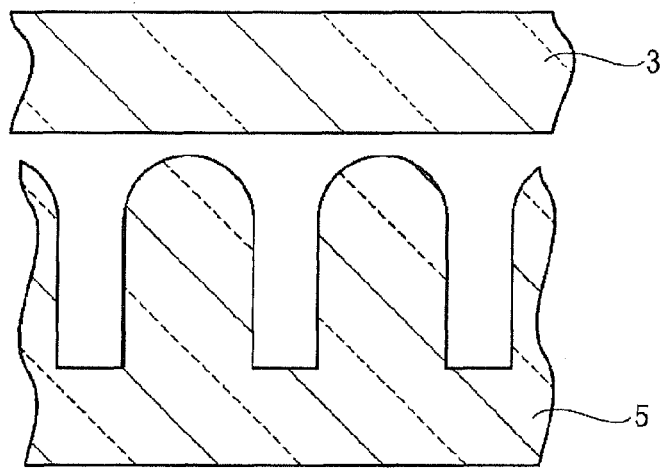
FIGS. 16A to 16C illustrate examples of a cross-section of the optical element when a first light transmissive layer and a second light transmissive layer are thermally welded or solvent-welded to each other by a second or third method of reducing the influence of the rounding upon upward transmittance, which is caused by the rounding of the shape of the distal end of the structure unit.
Figure 16B:
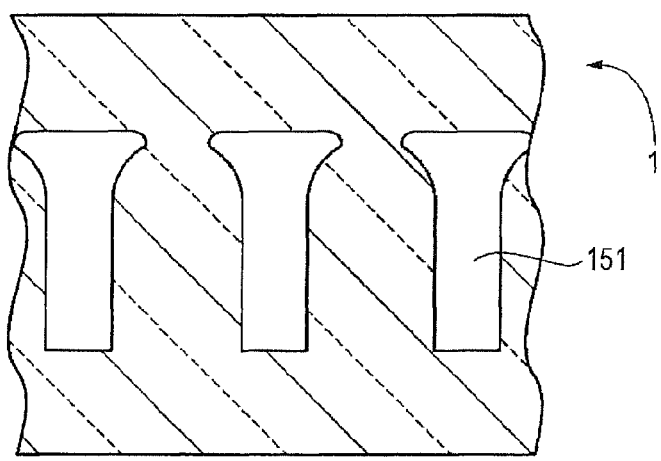
Figure 16C:
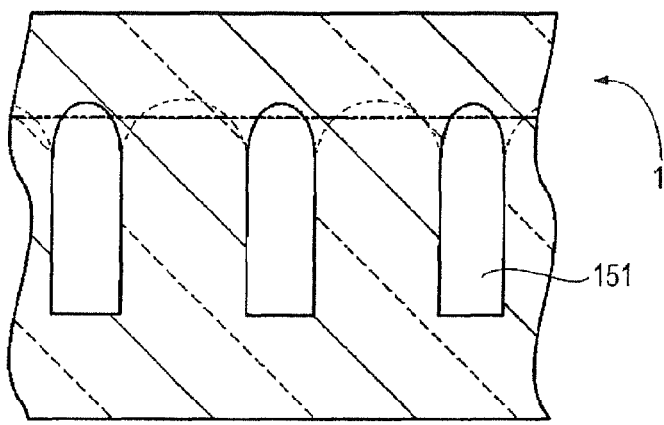

FIGS. 16A to 16C illustrate examples of a cross-section of the optical element when the first light transmissive layer 3 and the second light transmissive layer 5 are thermally welded or solvent-welded to each other by the above-described second or third method. As one experimental example, the distal end of the structure unit forming the structure layer, having the shape illustrated in FIG. 16A, and the first light transmissive layer 3 were joined to each other by using the above-described second method. By observing a cross-section of the optical element 1 obtained in such an example, it was confirmed that, as illustrated in FIG. 16B, an apex portion of the distal end of the structure unit was welded to the first light transmissive layer and the interface therebetween was not found. It is hence possible to reduce not only the proportion of the rounded portion in the distal end of the structure unit, but also the divergence of light caused by the rounded portion of the distal end of the structure unit. Further, when overpressure is applied in the thermal-welding or solvent-welding step according to the second or third method, the obtained optical element may have a cross-section illustrated in FIG. 16C. Even in such a case, since the apex portion of the distal end of the structure unit is welded to the first light transmissive layer and there exists no interface therebetween, the divergence of light caused by the rounded portion of the distal end of the structure unit can be reduced.

3. THIRD EMBODIMENT

A third embodiment relates to an optical element in which the reduction in the amount of light output upwards with respect to the optical element can be suppressed even when the surface of the structure layer has fine ruggedness.

Figure 17A:
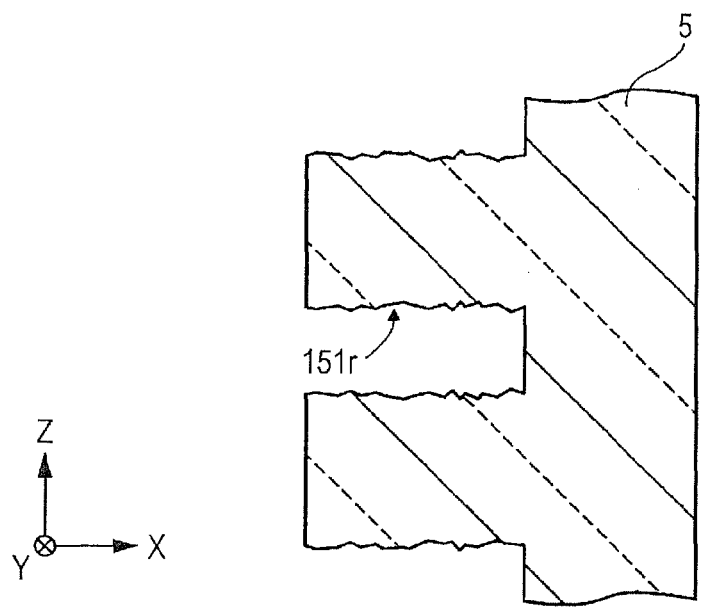
FIGS. 17A and 17B are illustrations to explain, when the surface of the structure layer has fine ruggedness, the influence of the presence of the fine ruggedness upon upward transmittance.
Figure 17B:
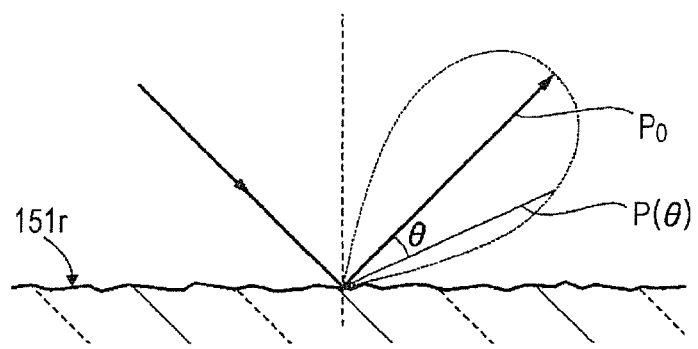

FIGS. 17A and 17B are illustrations to explain, when the surface of the structure layer has fine ruggedness, the influence of the presence of the fine ruggedness upon the upward transmittance. FIG. 17A is a schematic sectional view of a part of the structure layer. The surface of the structure layer of the optical element, i.e., the reflecting surface 151r, is ideally a smooth surface. In fact, however, the reflecting surface 151r has fine ruggedness as illustrated in FIG. 17A. The fine ruggedness is generated, for example, through such a process that fine ruggedness having been produced in the step of fabricating the master is transferred to the reflecting surface 151r.

The fine ruggedness of the reflecting surface 151r may be substantially periodic, but it is present at random with high probability. The fine ruggedness of the reflecting surface 151r diffusively reflects the light impinging on the reflecting surface 151r. It is therefore thought that energy of the light reflected by the reflecting surface 151r having the fine ruggedness is distributed in accordance with the Gaussian distribution with the direction of specular reflection being at a center.

FIG. 17B illustrates the energy distribution of the light reflected by the reflecting surface 151r having the fine ruggedness. An angle θ denoted in FIG. 17B represents an angle that is measured with respect to the direction of specular reflection in the XZ-plane. P(θ) representing the luminosity or the radiance in the direction θ is expressed by the following formula (18):

$$P(\theta) = P_0 \exp\left[-\frac{\theta^2}{2\sigma^2}\right] \quad (18)$$

In the above formula (18), $P_0$ is the luminosity or the radiance in the direction of specular reflection, and σ represents the standard deviation of the Gaussian distribution. In the following description, the standard deviation σ is referred to as "surface roughness" for the convenience of explanation.

The light reflected by the reflecting surface 151r having the fine ruggedness can be regarded as having the energy distribution represented by P(θ). Therefore, an impingement angle to the light emergent surface S2 at which the light impinges on the light emergent surface S2 after being reflected by the reflecting surface 151r has a certain variation. With such a variation, the light is unintentionally totally reflected at the light emergent surface S2 depending on the impingement angle to the light emergent surface S2, and the upward transmittance is reduced in comparison with the case where the reflecting surface 151r is a smooth surface.

Figure 18A:
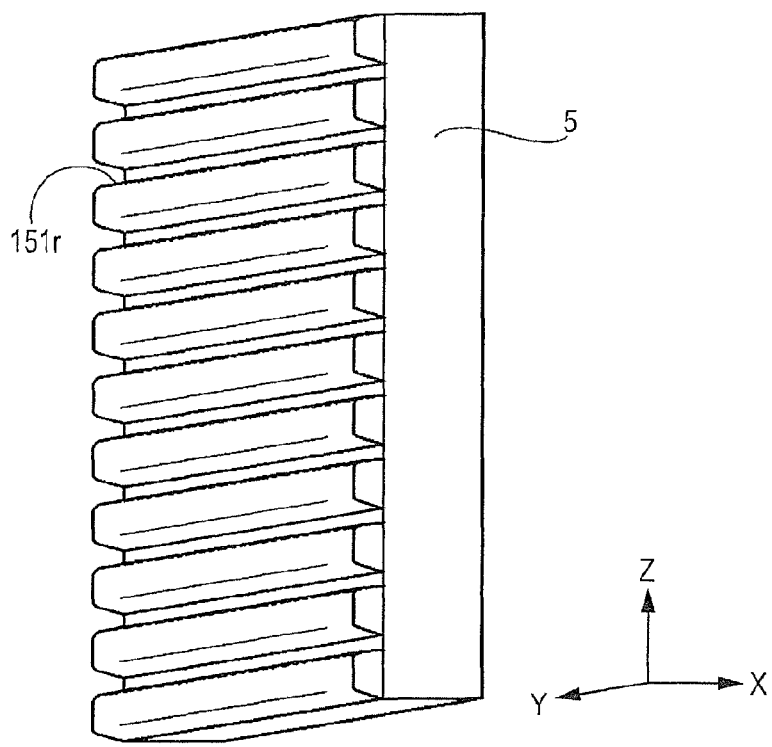
FIGS. 18A and 18B are illustrations explaining the shape of the structure layer, which is presumed in a simulation.
Figure 18B:
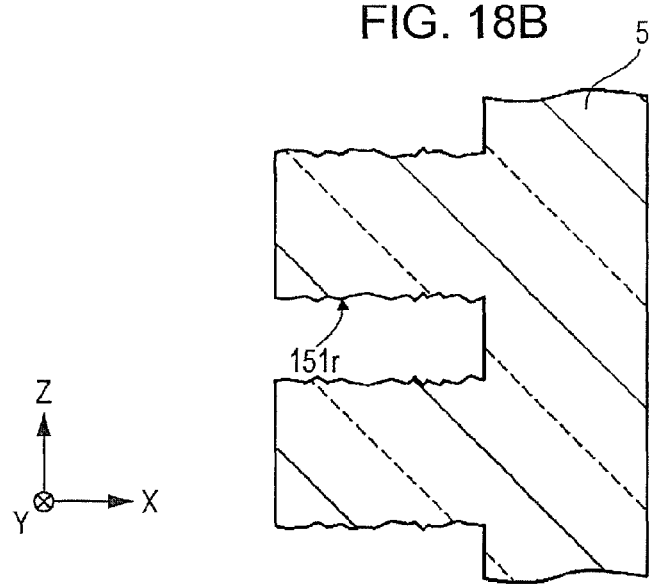

To examine the influence of the fine ruggedness of the reflecting surface upon the upward transmittance, simulations were performed on the premise that the structure layer had the shape illustrated in FIGS. 18A and 18B. The optical simulation software (Light Tools) available from ORA was used to perform the simulations.

Figure 19A:
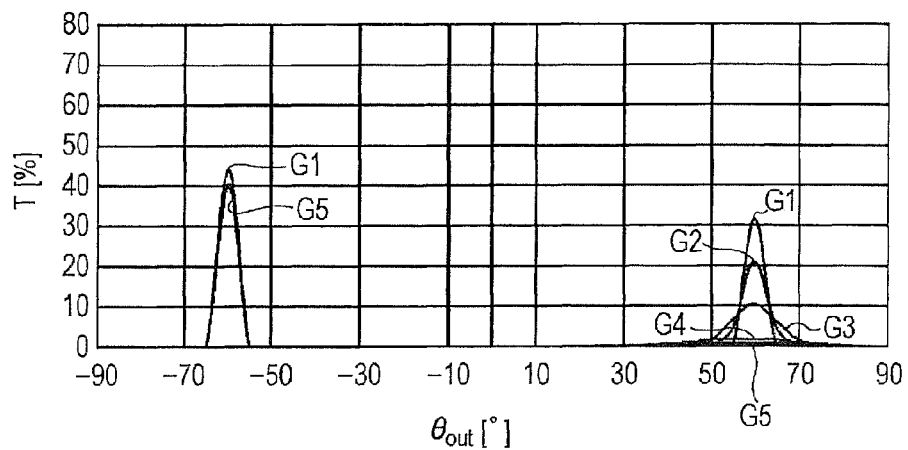
FIGS. 19A and 19B are graphs to explain the simulation results when an irradiation angle is set to 60'.
Figure 19B:
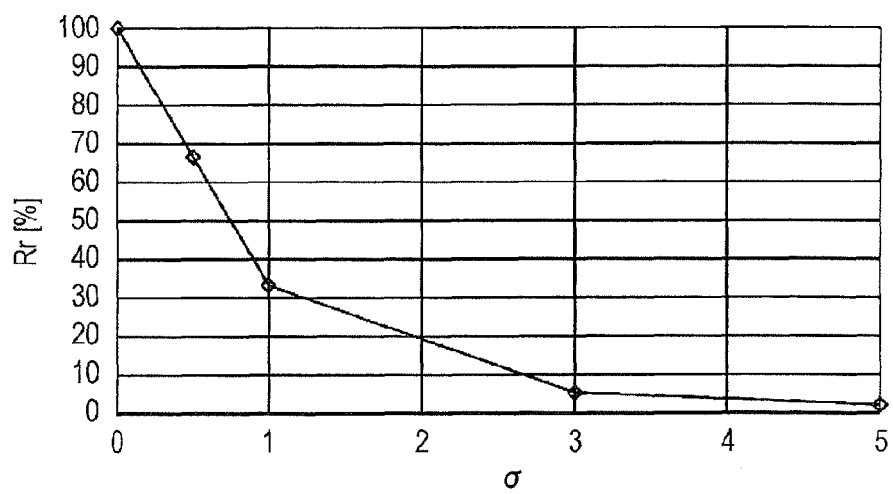
Figure 20A:
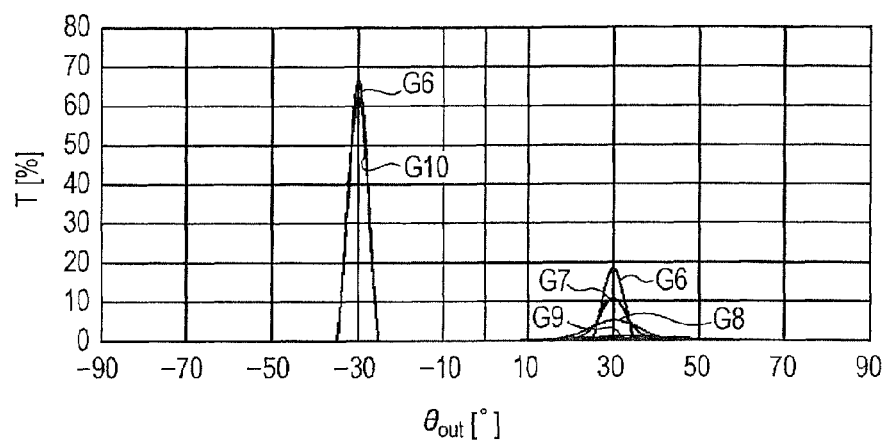
FIGS. 20A and 20B are graphs to explain the simulation results when the irradiation angle is set to 30°.
Figure 20B:
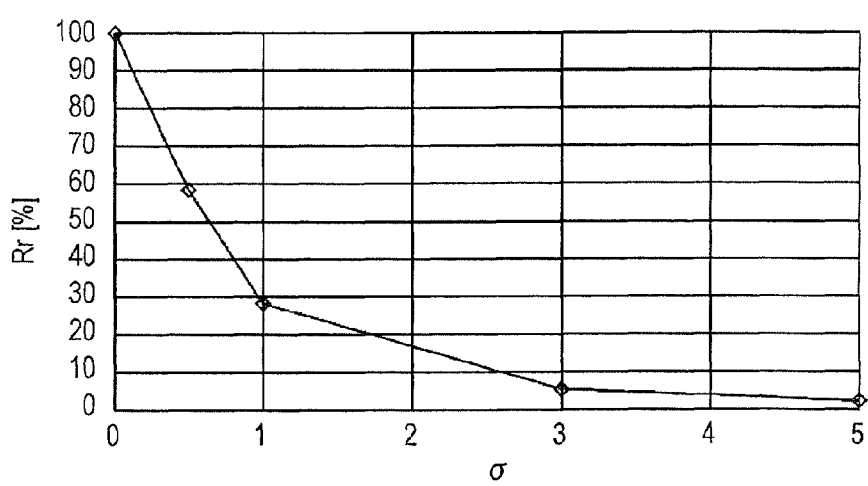

FIG. 19A is a graph plotting transmittance T [%] with respect to the emergence (output) angle $\theta_{out}$ [°] when the irradiation angle is set to 60°. The transmittance T at $\theta_{out} \geq 0°$ corresponds to the upward transmittance. In the graph of FIG. 19A, G1 to G5 represent respectively the simulation results at σ=0°, 0.5°, 1°, 3°, and 5°. FIG. 19B is a graph plotting relative upward transmittance Rr [%] with respect to the surface roughness a when the irradiation angle is set to 60°. FIG. 20A is a graph plotting transmittance T [%] with respect to the emergence angle $\theta_{out}$ [°] when the irradiation angle is set to 30°. In the graph of FIG. 20A, G6 to G10 represent respectively the simulation results at σ=0°, 0.5°, 1°, 3°, and 5°. FIG. 20B is a graph plotting relative upward transmittance Rr [%] with respect to the surface roughness a when the irradiation angle is set to 30°. Herein, the term "relative upward transmittance Rr [%]" implies a ratio of the upward transmittance at each value of a to the upward transmittance at σ=0°.

The following points are understood from the simulation results of FIGS. 19A and 19B and FIGS. 20A and 20B. The surface roughness a satisfies preferably σ≤5° and more preferably σ≤2.5°. When σ≤5° is satisfied, it can be ensured that the relative upward transmittance is held at least 1% or more. Further, when σ≤2.5° is satisfied, it can be ensured that the relative upward transmittance is held 10% or more. Even more preferably, σ≤1° is satisfied. When σ≤1° is satisfied, it can be ensured that the relative upward transmittance is held 25% or more.

The surface roughness σ of the optical element can be estimated, for example; as follows. First, arithmetic average ruggedness Ra is obtained by cutting the optical element along the XZ-plane, and by observing the sectional shape of the reflecting surface 151r. Then, a comparative sample of which Ra has been determined in advance is prepared and P(θ) of the comparative sample is measured by using a spectroscopic goniometer. Alternatively, P(θ) is obtained through a simulation. Thus, σ at P(θ) of the comparative sample having Ra, of which value is close to that of Ra obtained by observing the cross-section of the optical element, can be regarded as the surface roughness a of the optical element.

Thus, when the surface of the structure layer has the fine ruggedness, the optical element 1 is to be designed such that the standard deviation of the energy distribution of the reflected light satisfies the above-described condition. As a result, the reduction of the upward transmittance of the optical element 1 caused by the fine ruggedness of the reflecting surface can be suppressed.

EXAMPLES

The present technology will be described in more detail below in connection with EXAMPLES, but the present technology is not limited to the following EXAMPLES.

Test Example 1

In TEST EXAMPLE 1 described below, the influence upon the transmittance caused by the rounding of the shape of the distal end of the structure unit forming the structure layer was determined through simulations. The simulations were performed on optical elements, described in the following TEST EXAMPLES 1-1 to 1-7, by using the optical simulation software (Light Tools) available from ORA. On the premise that the rounded portion of the distal end of the structure unit was in the form of a circular are, the transmittance T [%] was determined while the curvature of the circular arc was changed.

Test Example 1-1

First, the structure unit forming the structure layer was premised to be similar to that illustrated in FIGS. 14A and 14B. Further, it was premised that the curvature was 0.01 and the irradiation angle was 0°.

Test Example 1-2

The structure unit forming the structure layer was premised as in TEST EXAMPLE 1-1 except that the curvature was set to 0.02.

Test Example 1-3

The structure unit forming the structure layer was premised as in TEST EXAMPLE 1-1 except that the curvature was set to 0.03.

Test Example 1-4

The structure unit forming the structure layer was premised as in TEST EXAMPLE 1-1 except that the shape of the distal end of the structure unit was not rounded (namely, it had no curvature) and the irradiation angle was set to 60°.

Test Example 1-5

The structure unit forming the structure layer was premised as in TEST EXAMPLE 1-1 except that the curvature was set to 0.01 and the irradiation angle was set to 60°.

Test Example 1-6

The structure unit forming the structure layer was premised as in TEST EXAMPLE 1-1 except that the curvature was set to 0.02 and the irradiation angle was set to 60°.

Test Example 1-7

The structure unit forming the structure layer was premised as in TEST EXAMPLE 1-1 except that the curvature was set to 0.03 and the irradiation angle was set to 60°.

Figure 21A:
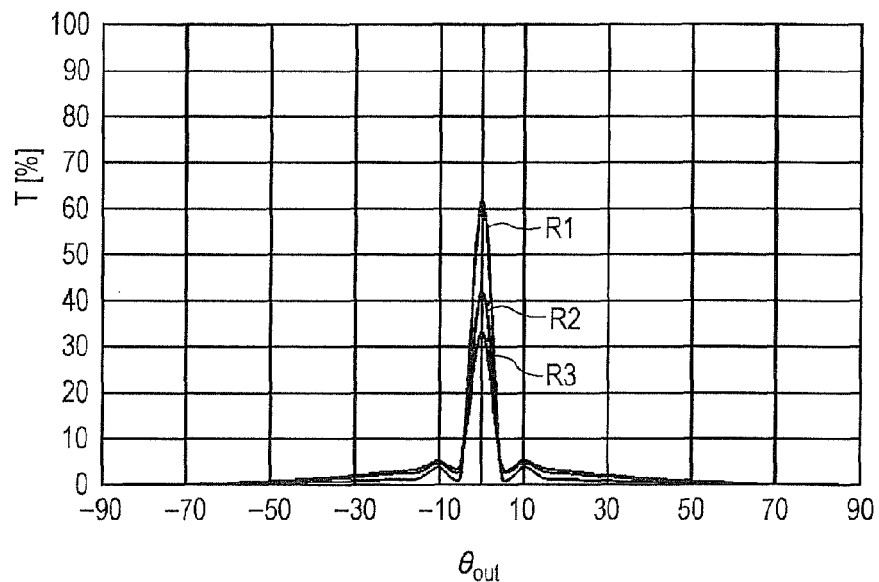
FIG. 21A is a graph plotting the results of simulations performed on structure units forming structure layers that are used in TEST EXAMPLES 1-1 to 1-3.
Figure 21B:
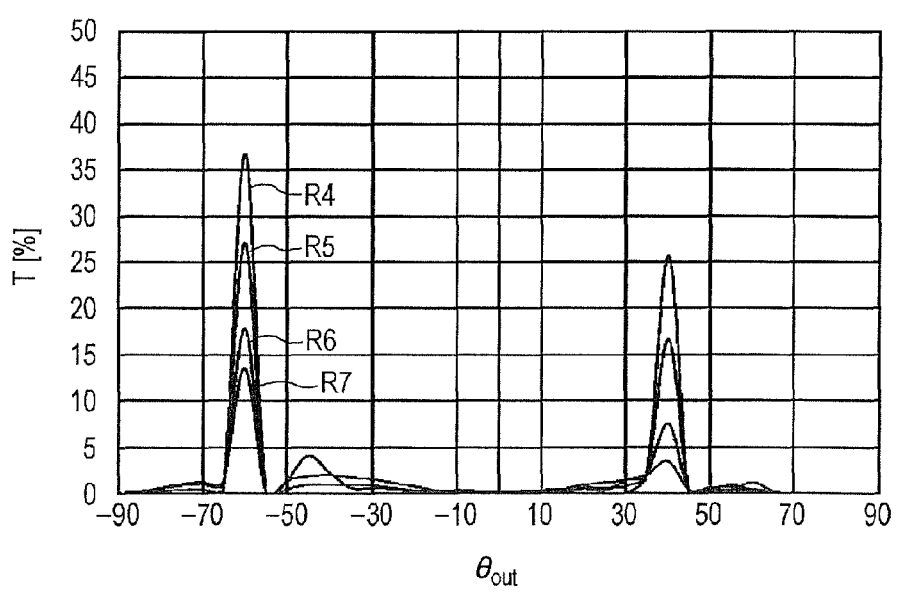
FIG. 21B is a graph plotting the results of simulations performed on structure units forming structure layers that are used in TEST EXAMPLES 1-4 to 1-7.

FIG. 21A is a graph plotting the results of the simulations performed on the structure units forming the structure layers, which are employed in TEST EXAMPLES 1-1 to 1-3. In the graph of FIG. 21A, R1 to R3 represent respectively the simulation results in TEST EXAMPLES 1-1, 1-2 and 1-3. Further, FIG. 21B is a graph plotting the results of the simulations performed on the structure units forming the structure layers, which are employed in TEST EXAMPLES 1-4 to 1-7. In the graph of FIG. 21B, R4 to R7 represent respectively the simulation results in TEST EXAMPLES 1-4, 1-5, 1-6 and 1-7.

Figure 22A:
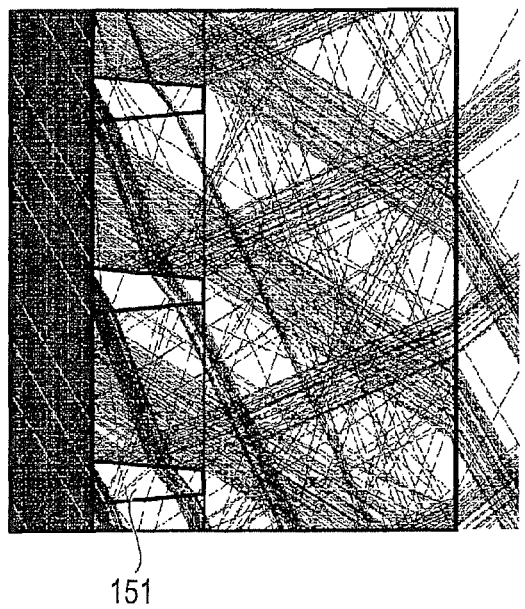
FIGS. 22A and 22B illustrate the simulation results representing a reduction of the action of taking in light incident on the optical element with an increase of the curvature when the irradiation angle is set to 60°.
Figure 22B:
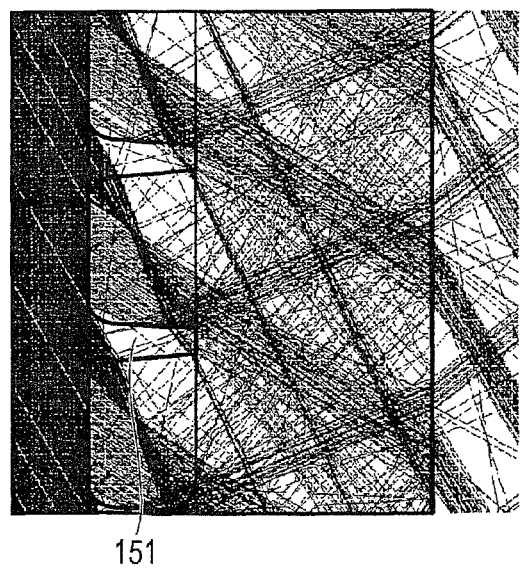
Figure 23A:
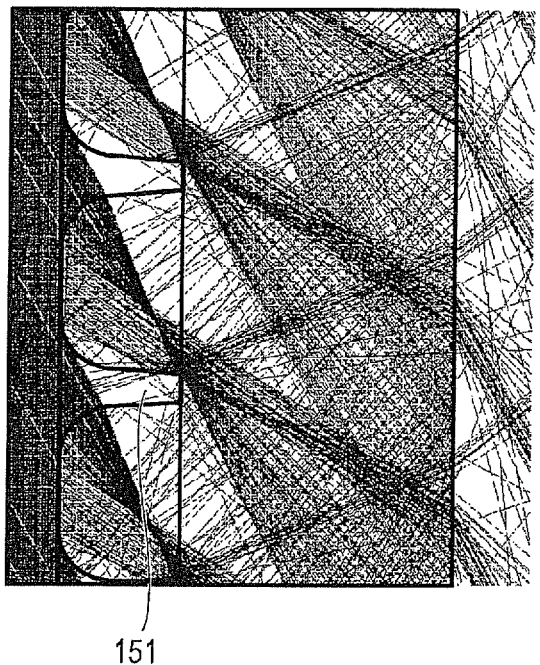
FIGS. 23A and 23B illustrate the simulation results representing a reduction of the action of taking in light incident on the optical element with an increase of the curvature when the irradiation angle is set to 60°.
Figure 23B:
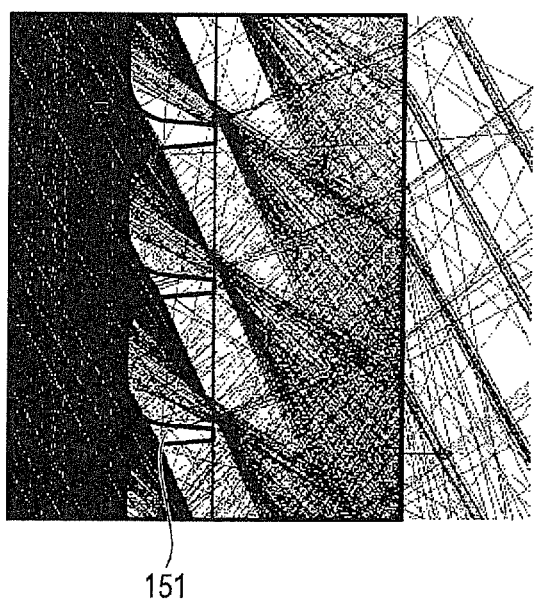

The following points are understood from FIGS. 21A and 21B. At the irradiation angle of 0°, as the curvature increases, a peak of the transmittance lowers and the optical element exhibits a broader optical characteristic. At the irradiation angle of 60°, as the curvature increases, both upward transmittance ($\theta_{out} \geq 0°$) and downward transmittance ($\theta_{out} \geq 0°$) decrease. In other words, the action of taking in the light incident on the optical element is reduced. FIGS. 22A and 22B and FIGS. 23A and 23B illustrate the simulation results representing the reduction of the action of taking in the light incident on the optical element with an increase of the curvature when the illumination angle is set to 60°. FIG. 22A corresponds to the simulation result in TEST EXAMPLE 1-4, and FIG. 22B corresponds to the simulation result in TEST EXAMPLE 1-5. FIG. 23A corresponds to the simulation result in TEST EXAMPLE 1-6, and FIG. 23B corresponds to the simulation result in TEST EXAMPLE 1-7.

Test Example 2

In TEST EXAMPLE 2 described below, the influence upon the transmittance caused by the fine ruggedness in the surface (reflecting surface) of the structure unit forming the structure layer was determined through simulations. The simulations were performed on optical elements, described in the following TEST EXAMPLES 2-1 to 2-6, by using the optical simulation software (Light Tools) available from ORA. For each of the case where the reflecting surface had a scattering (diffusion) characteristic and the case where the reflecting surface had no scattering characteristic ($\sigma=0°$), the transmittance T [%] was determined while the irradiation angle was changed.

Test Example 2-1

First, the structure unit forming the structure layer was premised to be similar to that illustrated in FIGS. 18A and 18B. Further, it was premised that the reflecting surface 151$r$ had a scattering characteristic, namely, the reflected light had an energy distribution in accordance with the Gaussian distribution, and the irradiation angle was 10°.

Test Example 2-2

The structure unit forming the structure layer was premised as in TEST EXAMPLE 2-1 except that the irradiation angle was set to 30°.

Test Example 2-3

The structure unit forming the structure layer was premised as in TEST EXAMPLE 2-1 except that the irradiation angle was set to 60°.

Test Example 2-4

The structure unit forming the structure layer was premised as in TEST EXAMPLE 2-1 except that the reflecting surface 151$r$ had no scattering characteristic and the irradiation angle was set to 10°.

Test Example 2-5

The structure unit forming the structure layer was premised as in TEST EXAMPLE 2-1 except that the reflecting surface 151$r$ had no scattering characteristic and the irradiation angle was set to 30°.

Test Example 2-6

The structure unit forming the structure layer was premised as in TEST EXAMPLE 2-1 except that the reflecting surface 151$r$ had no scattering characteristic and the irradiation angle was set to 60°.

Figure 24A:
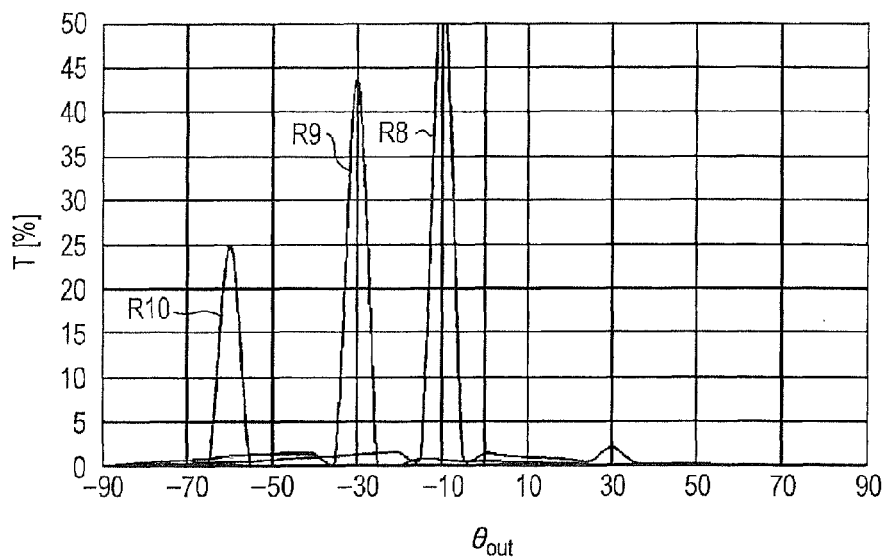
FIG. 24A is a graph plotting the results of simulations performed under a condition of σ=5° on structure units forming structure layers that are used in TEST EXAMPLES 2-1 to 2-3.
Figure 24B:
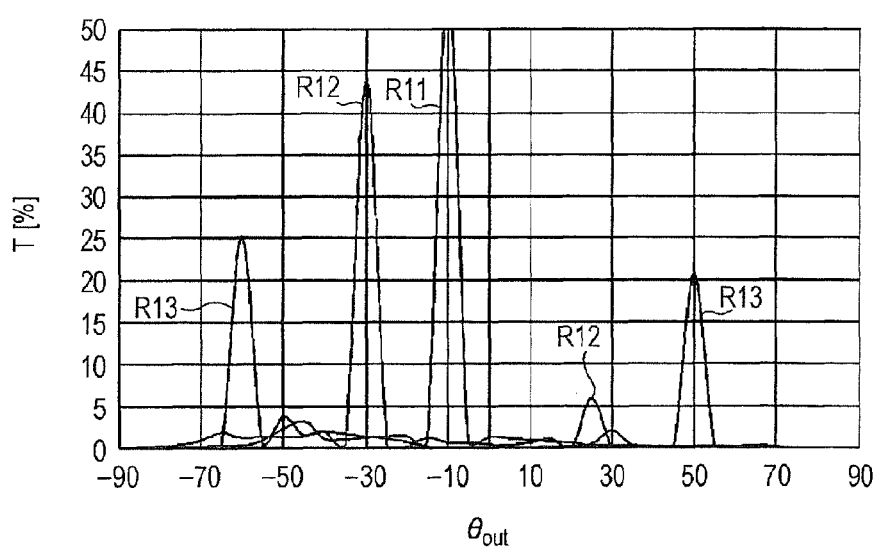
FIG. 24B is a graph plotting the results of simulations under the condition of σ=5° performed on structure units forming structure layers that are used in TEST EXAMPLES 2-4 to 2-6.

FIG. 24A is a graph plotting the results of the simulations performed on the structure units forming the structure layers, which are employed in TEST EXAMPLES 2-1 to 2-3. In the graph of FIG. 24A, R8 to R10 represent respectively the simulation results in TEST EXAMPLES 2-1, 2-2 and 2-3 under the condition of σ=5°. Further, FIG. 24B is a graph plotting the results of the simulations performed on the structure units forming the structure layers, which are employed in TEST EXAMPLES 2-4 to 2-6. In the graph of FIG. 24B, R11 to R13 represent respectively the simulation results in TEST EXAMPLES 2-4, 2-5 and 2-6 under the condition of σ=5°.

As understood from FIGS. 24A and 24B, when the reflecting surface 151r has the scattering characteristic, the upward transmittance is reduced in comparison with the case where the reflecting surface 151r has no scattering characteristic. Further, the reduction of the upward transmittance is more significant at a larger irradiation angle.

4. MODIFICATIONS

While the embodiments have been description in detail, the present technology is not limited to the above-described embodiments, and it can be variously modified on the basis of the technical concept.

First Modification

Figure 25A:
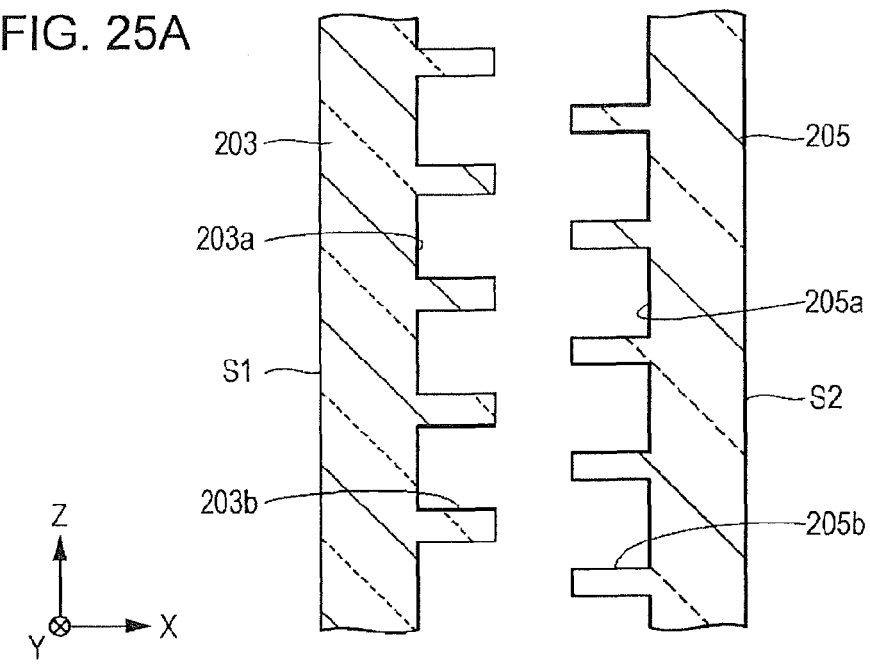
FIGS. 25A and 25B illustrate an optical element according to a first modification.
Figure 25B:
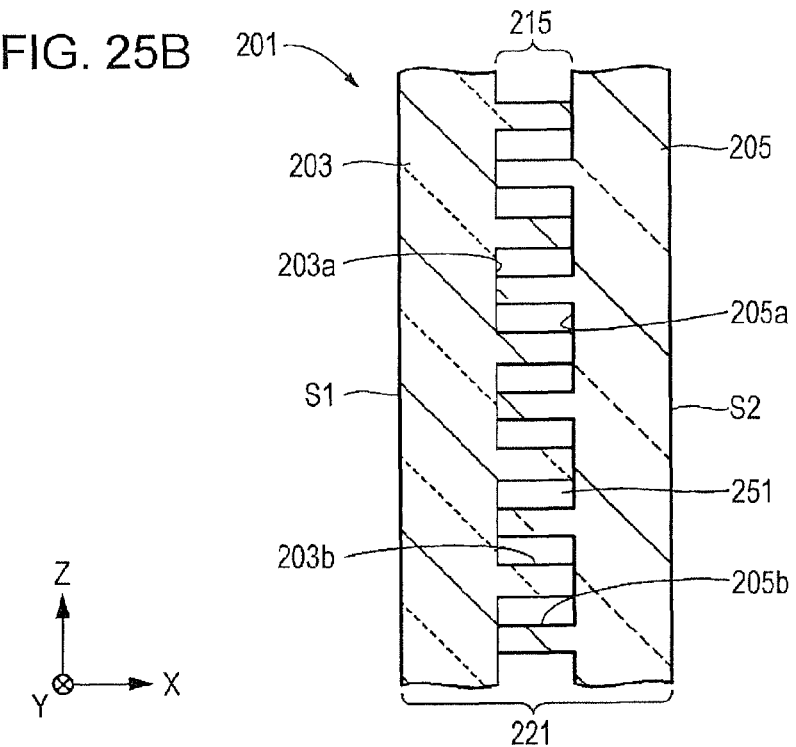

FIGS. 25A and 25B illustrate an optical element 201 according to a first modification.

The optical element 201 according to the first modification basically includes a first light transmissive layer 203 and a second light transmissive layer 205. As illustrated in FIG. 25A, the first light transmissive layer 203 has an outer surface forming a light incident surface S1, and an inner surface in which a plurality of recesses 203a are formed such that the recesses 203a are each extended in the Y-axis direction and are arrayed at a pitch in the Z-axis direction. On the other hand, the second light transmissive layer 205 has an outer surface forming a light emergent surface S2, and an inner surface in which a plurality of recesses 205a are formed such that the recesses 205a are each extended in the Y-axis direction and are arrayed at a pitch in the Z-axis direction. Thus, the inner surfaces of the first light transmissive layer 203 and the second light transmissive layer 205 include projections 203b and projections 205b, which are demarcated by the recesses 203a and the recesses 205a, respectively. The projections 203b and 205b are projected substantially parallel in the X-axis direction and have the same projection length.

The optical element 201 according to the first modification is fabricated by arranging the first light transmissive layer 203 and the second light transmissive layer 205, as illustrated in FIG. 25B, into such a stacked structure that the projections 203b or 205b on one layer are positioned at midpoints of the corresponding recesses 203a or 205a on the other layer. As a result, a structure layer 215 is formed which includes a plurality of spaces 251 having the same shape and arrayed at a pitch in the Z-axis direction, the spaces 251 being positioned in the recesses 203a and 205a in a state sandwiched between the projections 203b and 205b. Thus, the optical element 201 having a transparent layer 221, which includes the structure layer 215, is constructed.

In the optical element 201 according to the first modification, a reflecting surface for reflecting the sunlight is formed by a surface defining each space 251 on the upper side thereof. The depth, width, and array pitch of the spaces 251 are set respectively depending on the height, width, and array pitch of the projections 203b and 205b. Even in the optical element 210 constructed as described above, advantageous effects similar to those in the foregoing embodiments can also be obtained by applying the above-described design method in consideration of the deviation (deformation) of the shape of the structure layer.

The first light transmissive layer 203 and the second light transmissive layer 205 can be each fabricated by using the master illustrated in FIG. 7A. Both the light transmissive layers 203 and 205 may be joined to each other by using, e.g., a transparent adhesive. Alternatively, when distal ends of the projections 203b and 205b are rounded, both the light transmissive layers 203 and 205 may be joined to each other in a manner of reducing the rounding by using one of the methods described above with reference to FIGS. 15A to 15C.

Second Modification

Figure 26:
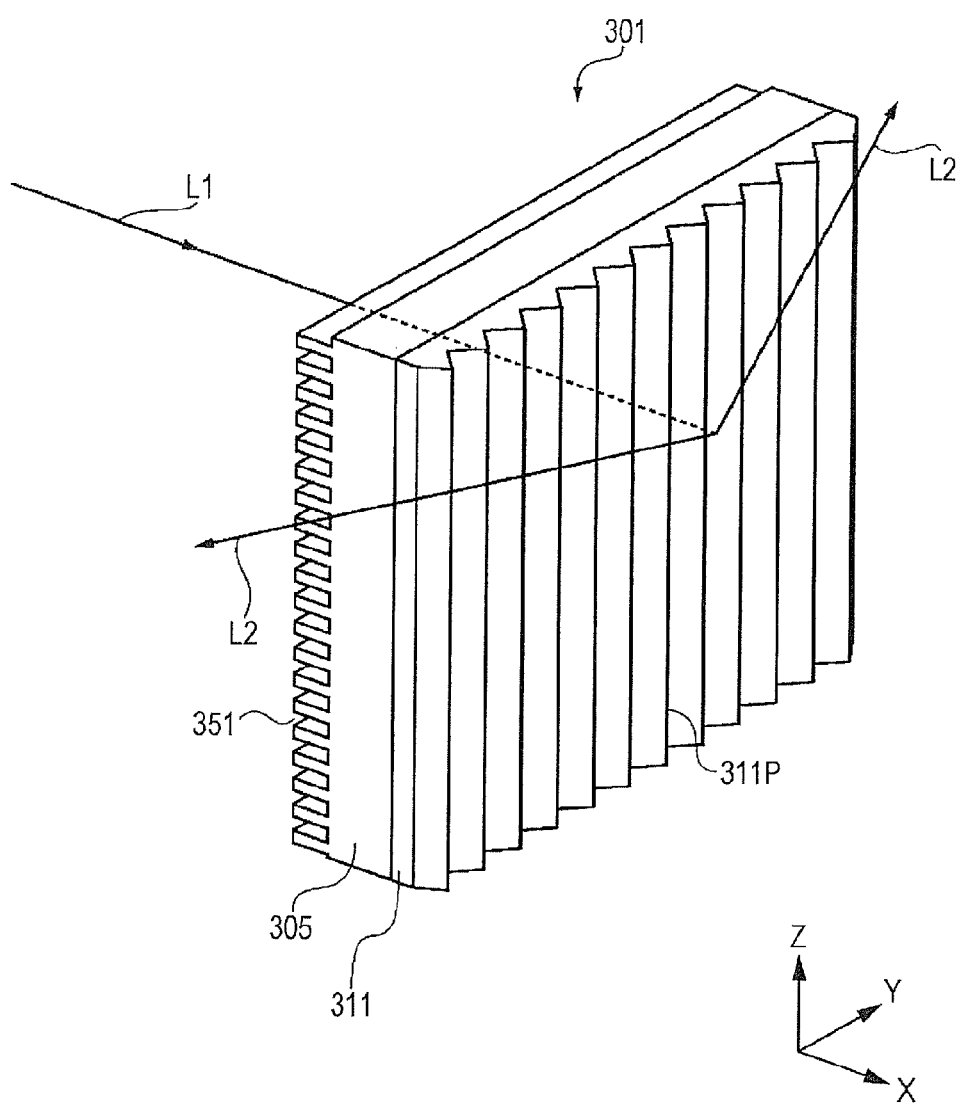
FIG. 26 is a perspective view of an optical element according to a second modification.

FIG. 26 is a perspective view of an optical element 301 according to a second modification. The optical element 301 according to the second modification has a multilayer structure including a light transmissive layer 305 including spaces 351 formed in one surface thereof, and a prism sheet 311 (second base) having a structure surface on which prisms 311P are arrayed. The spaces 351 are formed in the one surface of the light transmissive layer 305 on the light incident side, and the prisms 311P are formed in the other surface of the light transmissive layer 305 on the light emergent side. The prisms 311P are each formed with its ridgeline extending in the Z-axis direction and are arrayed at a pitch in the Y-axis direction.

In the optical element 301 constructed as described above, the ridgeline direction of each prism 331P is aligned with the direction in which the spaces 351 are arrayed at a pitch (i.e., with the Z-axis direction). Therefore, incident light reflected by the surface defining each space 351 on the upper side thereof (i.e., the reflecting surface) is output from the optical element 301 such that emergent light is diffused (spread) in the Y-axis direction by the refractive action at sloped surfaces of the prisms 311P when the light exits the prism sheet 311 after passing through it. As a result, the function of outputting the light, which has entered the optical element 301, upwards and the function of diffusing the incident light laterally can be obtained at the same time.

Respective values of the array pitch, the height, the apex angle, etc. of the prisms 311P can be set as appropriate depending on the intended light output characteristic. Further, the incident light can be separated into four directions, i.e., upwards, downwards, leftwards, and rightwards, by using the light transmissive layer 305 and the prism sheet 311.

The form of the prisms 311P is not limited to a periodic one, and the prisms 311P may be aperiodically formed in different sizes and/or different shapes. Further, the prism sheet 311 may be arranged on the light incident side of the light transmissive layer 305. In addition, the array direction of the prisms 311P is not limited to the Y-axis direction as in the above-described construction, and it may be set to obliquely intersect the array direction of the spaces 351.

The base for diffusing (spreading) the light is not limited to the prism sheet described above, and it may also be practiced by using suitable one of various light transmissive films including light diffusing elements, which have periodic or aperiodic shapes, such as a crimped film, a light transmissive film including striped crimps, and a light transmissive film including semispherical or cylindrical curved lenses formed on its surface. Further, a film having the same structure layer as that of the light transmissive layer 305 may be used as the light diffusing film. In that case, a degree of diffusing the light can be increased by stacking the relevant film in such an orientation that the space extending direction of the relevant film intersects the space extending direction of the light transmissive layer 305 positioned on the light incident side.

Third Modification

Figure 27:
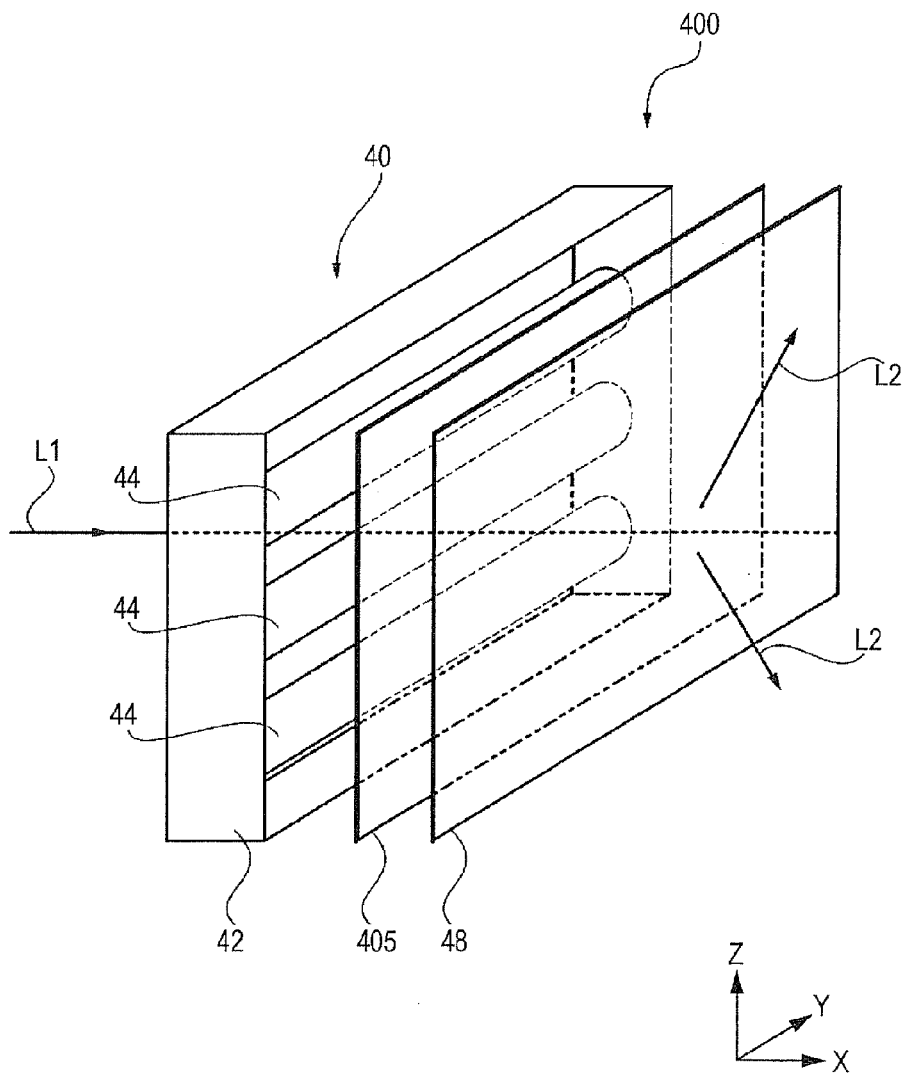
FIG. 27 illustrates a third modification.

FIG. 27 illustrates a third modification. An illumination device 400 according to the third modification includes a luminous body 40, an advertising medium 48, and a light transmissive film 405 arranged between the luminous body 40 and the advertising medium 48.

The luminous body 40 includes a plurality of linear light sources 44, and a casing 42 containing the light sources 44 therein. The inner surface of the casing 42 has a property of reflecting light, and it may be additionally given, where necessary, with the function of condensing light emitted from the light sources 44 toward the forwarding side.

The light transmissive film 405 is constructed similarly to the optical element according to one of the above-described embodiments. The light transmissive film 405 includes a light incident surface positioned to face the luminous body 40, and a light emergent surface positioned to face the advertising medium 48. On the light incident surface side of the light transmissive film 405, spaces having reflecting surfaces are arrayed at a predetermined pitch in the Z-axis direction.

The advertising medium 48 is formed of a film or a sheet having light transparency, and it has a surface on which advertising information, including characters, figures, photos, etc., is presented. The advertising medium 48 is arranged to be integrated with the luminous body 40 while covering the light transmissive film 405. When the advertising medium 48 is illuminated with illumination light that has been emitted from the luminous body 40 and that has passed through the light transmissive film 405, the advertising information is displayed toward the front direction.

According to the third modification, since the light transmissive film 405 has the function of directionally outputting the light upwards, for example, it is possible to produce a certain difference in amount of light passing through the advertising medium 48 between the upward direction and the downward direction. Thus, since a desired brightness distribution can be given to the advertising medium 48, a decoration effect of the advertising medium 48 is increased based on the difference in brightness, and visual attractiveness in design of advertising display can be improved. Further, according to the third modification, since the display light from the advertising medium 48 can be given with a different brightness distribution depending on the viewing direction, viewers can perceive the display and the decoration of the advertising medium 48 with feeling different depending on a position, an angle, a height, etc. to see the advertising medium 48.

Moreover, according to the third modification, the desired brightness distribution depending on the information to be displayed by the advertising medium 48 can be easily given by appropriately changing, e.g., the shape, the array pitch, the width, the depth, and the periodic feature of the spaces in the light transmissive film 405.

Fourth Modification

Figure 28A:
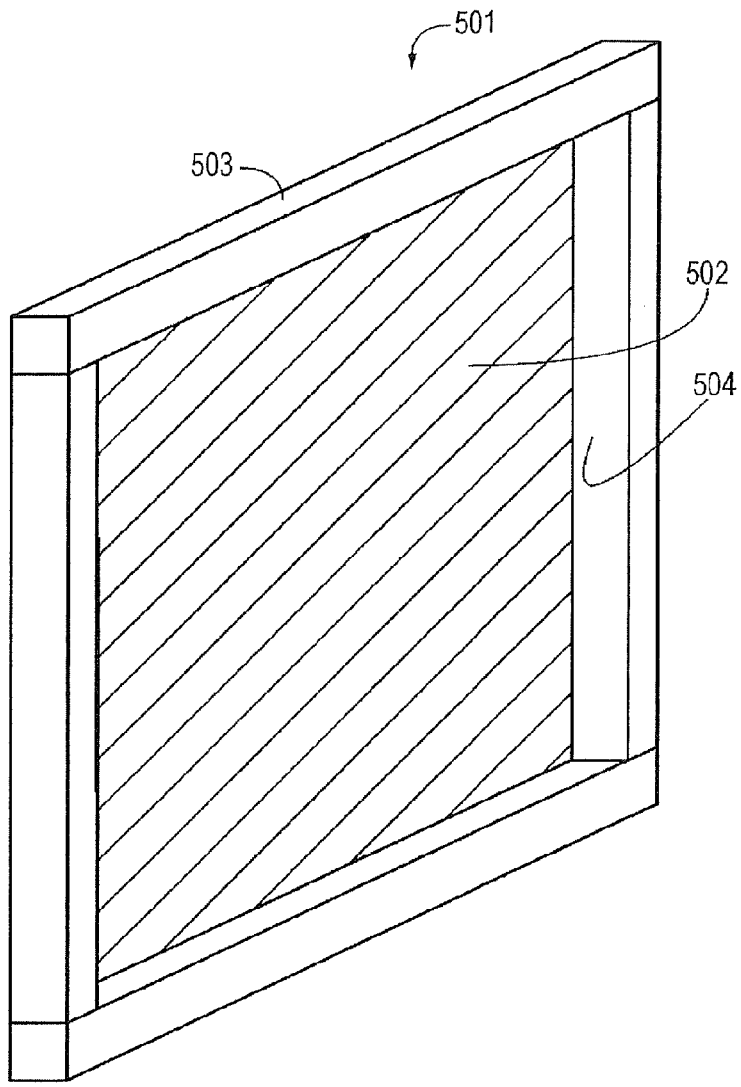
FIG. 28A is a perspective view illustrating one example of the construction of a fitting that includes the optical element disposed in a lighting portion.

The optical element may be applied to not only the illumination device, but also to a fitting (interior member or exterior member) provided with a lighting portion. FIG. 28A is a perspective view illustrating one example of the construction of a fitting that includes the optical element disposed in a lighting portion. As illustrated in FIG. 28A, a fitting 501 includes a lighting member 502 in a lighting portion (region) 504 thereof. In more detail, the fitting 501 includes the lighting member 502 and a frame member 503 that is disposed along peripheral edges of the lighting member 502. The lighting member 502 is fixedly held by the frame member 503, but it can be removed, when necessary, by disassembling the frame member 503. One example of the filling 501 is a shoji (i.e., a paper-made and/or glass-fitted sliding door). However, the fitting is not limited to the shoji and can be practiced in various forms including lighting portions (regions).

Figure 28B:
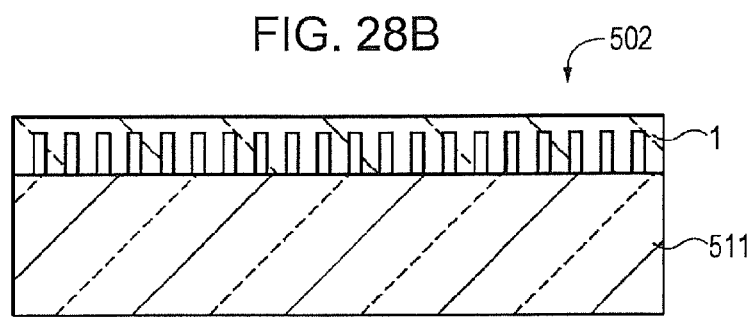
FIG. 28B is a sectional view illustrating one example of the construction of a lighting member.

FIG. 28B is a sectional view illustrating one example of the construction of the lighting member. As illustrated in FIG. 28B, the lighting member 502 includes a base 511 and an optical element 1. The optical element 1 is disposed on one of two principal surfaces of the base 511, which one is positioned on the incident surface side receiving incoming external light (i.e., on the side positioned to face a window member). The optical element 1 and the base 511 are joined to each other with a joining layer formed of, e.g., a bond layer or an adhesive layer interposed therebetween. The construction of the lighting member 502 is not limited to the illustrated one, and the optical element 1 may be itself used as the lighting member 502. As another example of the fitting, a window member disposed in a sash may be constructed similarly to the optical element.

Other Modifications

While the embodiments have been described, by way of example, as arranging the reflecting surface 151*r* to extend in the direction of thickness of the optical element (i.e., in the X-axis direction), a pair of reflecting surfaces formed by surfaces defining the space on the upper and lower sides thereof are not limited to parallel ones, and they may be not parallel to each other.

Figure 29A:
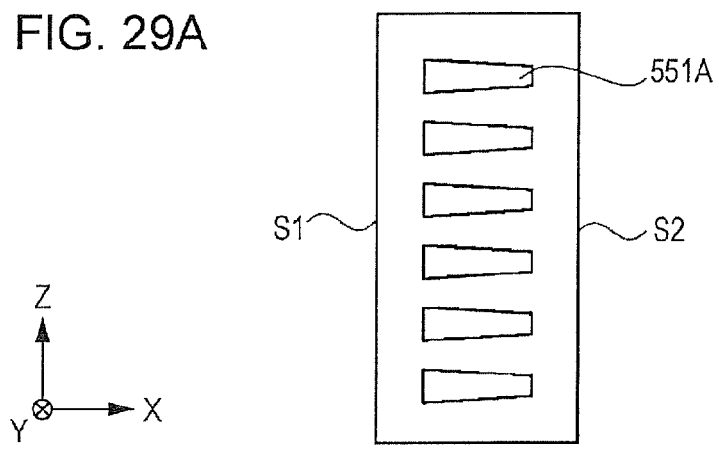
FIG. 29A is a schematic view of an optical element including a structure layer in which spaces are formed such that the distance between upper and lower surfaces defining each space, which are positioned to face each other, is continuously reduced from the light incident surface side toward the light emergent surface side.

As one example, FIG. 29A illustrates an optical element including a structure layer in which spaces 551A are formed such that the distance between the upper and lower surfaces defining each space, which are positioned to face each other, is continuously reduced from the side near the light incident surface S1 toward the side near the light emergent surface S2. On the other hand, an optical element illustrated in FIG. 29B has a structure in which a space 551Bu providing upper and lower reflecting surfaces both inclined in the +Z-direction from the side near the light incident surface S1 toward the side near the light emergent surface S2 and a space 551Bd providing upper and lower reflecting surfaces both inclined in the −Z-direction from the side near the light incident surface S1 toward the side near the light emergent surface S2 are alternately arrayed in the Z-direction. As an alternative, at least one of a pair of reflecting surfaces, which are formed by the upper and lower surfaces defining the space, may be inclined with respect to the X-axis. Further, FIG. 29C is a schematic view of an optical element including spaces 551C each of which provides a reflecting surface 551*r* inclined at a predetermined inclination angle with respect to the X-axis and a reflecting surface parallel to the X-axis direction.

Figure 29B:
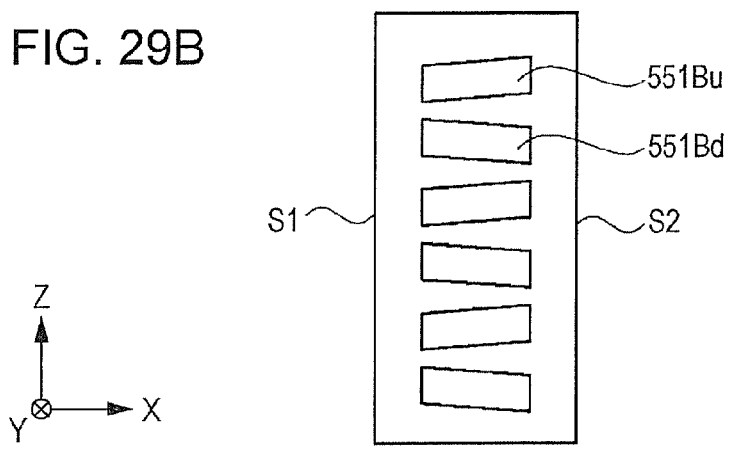
FIG. 29B is a schematic view of an optical element having a structure in which a space providing upper and lower reflecting surfaces both inclined in the +Z-direction from the light incident surface side toward the light emergent surface side and a space providing upper and lower reflecting surfaces both inclined in the −Z-direction from the light incident surface side toward the light emergent surface side are alternately arrayed in the Z-direction.
Figure 29C:
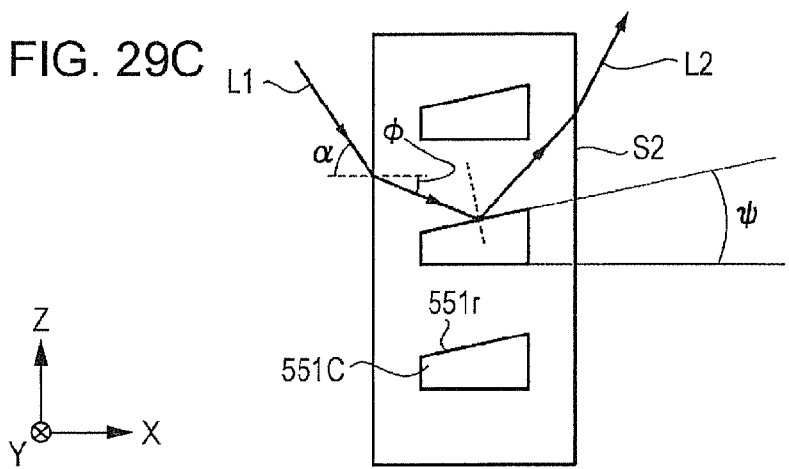
FIG. 29C is a schematic view of an optical element including spaces each of which provides a reflecting surface inclined at a predetermined inclination angle ψ with respect to an X-axis and a reflecting surface parallel to the X-axis direction.

The optical elements illustrated in FIGS. 29A, 29B and 29C are each fabricated by arranging two light transmissive layers into a stacked structure as described above with reference to FIGS. 7A to 7C. More specifically, the optical elements illustrated in FIGS. 29A and 29C can be each fabricated by joining a flat light transmissive layer to a light transmissive layer including trapezoidal projections formed thereon. Also, the optical element illustrated in FIG. 29B can be fabricated by arranging two light transmissive layers each including trapezoidal projections formed thereon into such a stacked structure that the trapezoidal projections of the two light transmissive layers are alternately positioned to leave spaces therebetween.

In addition to the examples illustrated in FIGS. 29A, 29B and 29C, the spaces having the sectional shapes illustrated in FIGS. 8A to 8F and FIGS. 9A to 9F can also be intentionally formed. Those sectional shapes can be obtained, for example, by joining two light transmissive layers, while a force is applied to one of the light transmissive layers in a direction (Z-axis direction) perpendicular to the first direction (X-axis direction), in the manufacturing process described above with reference to FIGS. 7A to 7C.

As described above in the first embodiment, the optical element is designed such that the inclination of the reflecting surface and the tilting and/or the curving in shape of the structure layer satisfies the foregoing formula (9). In that case, the inclination angle ψ is defined as an angle formed between a tangential line at an arbitrary point on the reflecting surface and the X-axis. By designing the optical element to satisfy the foregoing formula (9), finer control of light distribution and more complex light control function can be realized while the reduction of the upward transmittance is suppressed.

In addition, the multilayer structure of the optical element can be optionally set, for example, as illustrated in FIGS. 30A to 30F and FIGS. 31A to 31D.

Figure 30A:
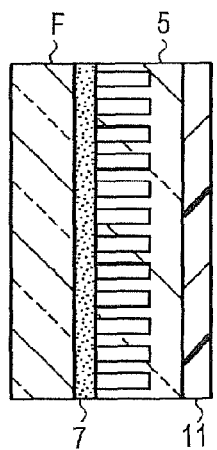
FIGS. 30A to 30F illustrate other examples of the multilayer structure of the optical element.
Figure 30B:
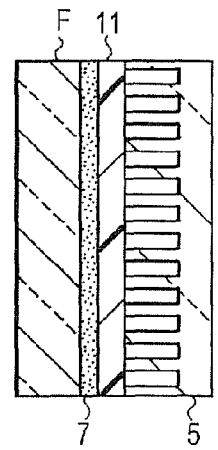

FIG. 30A illustrates an example in which the light transmissive layer 5 including the spaces is directly affixed at the bonding layer 7 to the window member F. The base 11 may be dispensed with as illustrated in FIG. 30E. FIG. 30B illustrates an example in which the base 11 is attached to the surface of the light transmissive layer 5, which surface includes the spaces formed therein, and the light transmissive layer 5 is affixed to the window member F with the base 11 interposed therebetween. In the example of FIG. 30B, after forming the light transmissive layer 5, the light transmissive layer 5 and the base 11 are integrated by thermal welding, for example. On that occasion, the light transmissive layer 5 and the base 11 can be welded to each other in such a state that no interface exists between both the films. Further, in the example of FIG. 30B, the bonding layer 7 can be avoided from entering the spaces.

Figure 30C:
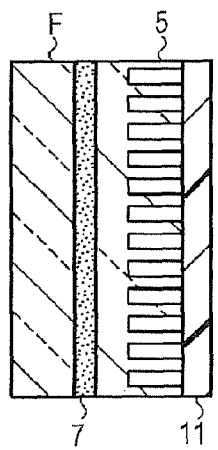
Figure 30D:
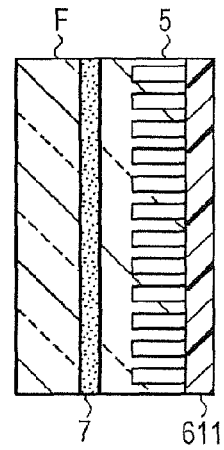
Figure 30E:
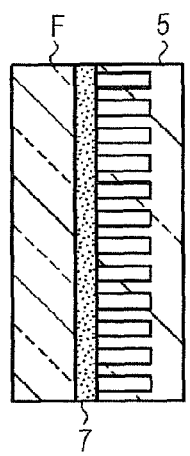
Figure 30F:
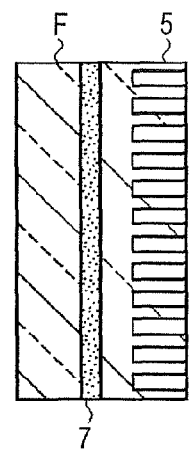

FIGS. 30C and 30D illustrate examples in which the light transmissive layer 5 is affixed to the window member F such that the spaces are positioned on the light emergent side. That arrangement can also provide similar advantages to those obtained with the first embodiment. In the arrangement of FIG. 30C, the base 11 may be dispensed with as illustrated in FIG. 30F. In the example of FIG. 30D, a shaped film 611 including light diffusing elements, e.g., prisms or crimps, formed on its surface is laminated onto the light emergent side of the light transmissive layer 5. The advantageous effect obtained by laminating the shaped film 611 is similar to that described above with reference to FIG. 26.

Figure 31A:
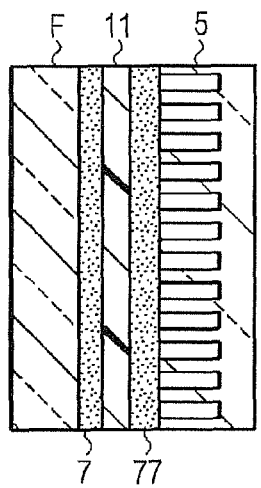
FIGS. 31A to 31D illustrate other examples of the multilayer structure of the optical element.
Figure 31B:
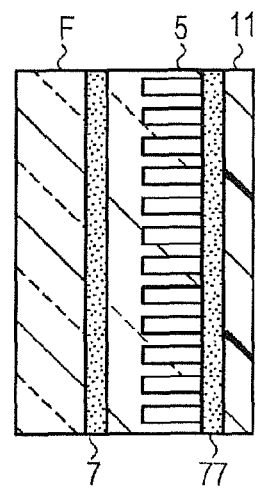

FIGS. 31A and 31B illustrate examples in which the light transmissive layer 5 and the base 11 are joined to each with a bonding layer 77 having light transparency interposed therebetween. The bonding layer 77 can be made of the same type material as that used for the bonding layer 7. In the example of FIG. 31A, the light transmissive layer 5 includes the spaces on the light incident side, and the base 11 is joined to the light incident side of the light transmissive layer 5. In the example of FIG. 31B, the light transmissive layer 5 includes the spaces on the light emergent side, and the base 11 is joined to the light emergent side of the light transmissive layer 5.

Figure 31C:
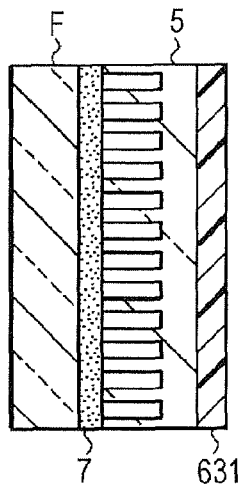
Figure 31D:
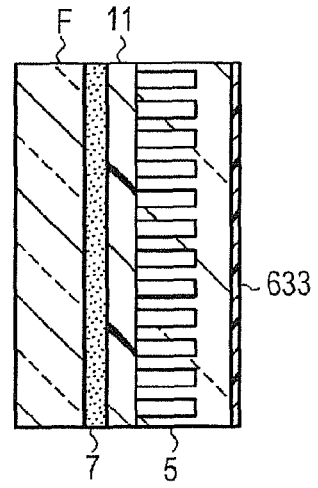

FIG. 31C illustrates an example in which the base 11 in FIG. 30A is replaced with a film 631 having a light diffusing property. FIG. 31D illustrates an example in which a shaped film 633 having a light diffusing property is joined, in the arrangement of FIG. 30B, to the light emergent side of the light transmissive layer 5. The light diffusing function may be given by forming the concave-convex shape directly in the light emergent surface of the light transmissive layer 5 instead of joining the shaped film 633.

The optical element may further include a hard coat layer from the viewpoint of making the surface of the optical element resistant against scratching. The hard coat layer is preferably formed on one of the light incident surface and the light emergent surface of the optical element 1 on the side oppositely away from the other surface that is attached to an adherend (attachment target), e.g., a window member. Moreover, the optical element may include a water-expellant or hydrophilic layer from the viewpoint of giving an antifouling property to the light emergent surface. In addition, the optical element may be used in combination with one or more of function layers, such as a heat-ray cutting layer, an ultraviolet cutting layer, and a surface-reflection reducing layer. An adhesive layer and a peeling-off layer may be further stacked onto the surface of the optical element, which is attached to the adherend, e.g., the window member. The presence of those layers enables the optical element to be easily attached to the adherend, e.g., the window member.

Depending on the use of the optical element, the optical element may be colored to provide a design with visual attractiveness.

While the light incident surface and the light emergent surface of the optical element are arranged vertically (i.e., in the Z-axis direction), the optical element may be disposed on a horizontal plane or an oblique plane. In that case, the shape of the space can be adjusted as appropriate so that collected light is output to the desired region. The light to be collected is not limited to the sunlight and may be artificial light. Further, the direction in which the light is collected is not limited to the direction from above, and the light may be collected laterally or from below. Emergent light may be separately output in plural directions.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

What is claimed is:

1. A method of manufacturing an optical element, the method comprising:

transferring a concave-convex shape formed in a master to a transfer material, thereby forming a first light transmissive layer that has a plurality of reflecting surfaces in a transfer surface thereof;

forming a plurality of elongated gaps into either of opposed first and second surfaces of a second light transmissive layer; and joining the first light transmissive layer to the second light transmissive layer, wherein the plurality of reflecting surfaces of the first light transmissive layer are arrayed along the elongated gaps in the second light transmissive layer, and wherein the reflecting surfaces have a first length in a depth direction of the concave-convex shape of the transfer surface and are arrayed at a pitch in a second direction perpendicular to the depth direction of the concave-convex shape, light incident on one principal surface of one of the first light transmissive layer and the second light transmissive layer is reflected by the reflecting surfaces toward one principal surface of the other layer, and following formulae (1) and (9) are satisfied:

$$d = (2n-1)\frac{p}{\tan\beta} \quad (n \in N) \quad (1)$$

$$(n_p + n_{air}\sin\alpha)(n_p - n_{air}\sin\alpha)\sin^2 2\psi \leq n_{air}^2(1 - \cos 2\psi \sin\alpha)^2 \quad (9)$$

(where d is the first length, n is a number of total reflections of the incident light at the same reflecting surface, p is an array pitch of the reflecting surfaces, β is an angle formed between a projection of the light impinging on the reflecting surface to a surface including the first and second directions and a tangential line at an arbitrary point on the reflecting surface (6.5°≤β≤87.5°, N is a set of natural numbers, $n_p$ is a refractive index of the first light transmissive layer, $n_{air}$ is a refractive index of air, α is an incidence angle of the light incident on the optical element, and ψ is an angle formed in the surface including the first and second directions between a tangential line at an arbitrary point on the reflecting surface and the first direction).

2. A method of manufacturing an optical element, the method comprising:
  transferring a concave-convex shape formed in a master to a transfer material, thereby forming a first light transmissive layer that has a plurality of reflecting surfaces in a transfer surface thereof;
  forming a plurality of elongated gaps into either of opposed first and second surfaces of a second light transmissive layer; and
  joining the first light transmissive layer to the second light transmissive layer,
  wherein the plurality of reflecting surfaces of the first light transmissive layer are arrayed along the elongated gaps in the second light transmissive layer, and
  wherein the reflecting surfaces have a curvature in at least a portion thereof, have a first length in a depth direction of the concave-convex shape of the transfer surface, and are arrayed at a pitch in a second direction perpendicular to the depth direction of the concave-convex shape,
  light incident on one principal surface of one of the first light transmissive layer and the second light transmissive layer is reflected by the reflecting surfaces toward one principal surface of the other layer, and
  following formulae (1) and (16) are satisfied:

$$d = (2n-1)\frac{p}{\tan\beta} \quad (n \in N) \tag{1}$$

$$(\beta + \xi) \le \text{Arccos}\left(-\frac{n_{air}}{n_p}\right) \tag{16}$$

(where d is the first length, n is a number of total reflections of the incident light at the same reflecting surface, p is an array pitch of the reflecting surfaces, β is an angle formed between a projection of the light impinging on the reflecting surface to a surface including the first and second directions and a tangential line at an arbitrary point on the reflecting surface (6.5°≤β≤87.5°), N is a set of natural numbers, $n_p$ is a refractive index of the first light transmissive layer, $n_{air}$ is a refractive index of air, and ξ is an angle of divergence of light diverging after being focused, the light impinging on the reflecting surface, when the portion of the reflecting surface having the curvature is regarded as a lens).

3. A method of manufacturing an optical element, the method comprising:
  transferring a concave-convex shape formed in a master to a transfer material, thereby forming a first light transmissive layer that has a plurality of reflecting surfaces in a transfer surface thereof;
  forming a plurality of elongated gaps into either of opposed first and second surfaces of a second light transmissive layer; and
  joining the first light transmissive layer to the second light transmissive layer,
  wherein the plurality of reflecting surfaces of the first light transmissive layer are arrayed along the elongated gaps in the second light transmissive layer, and
  wherein the reflecting surfaces have fine ruggedness, have a first length in a depth direction of the concave-convex shape of the transfer surface, and are arrayed at a pitch in a second direction perpendicular to the depth direction of the concave-convex shape,
  light incident on one principal surface of one of the first light transmissive layer and the second light transmissive layer is reflected by the reflecting surfaces toward one principal surface of the other layer, and
  an energy distribution of the light reflected by the reflecting surfaces is a Gaussian distribution with a direction of specula reflection being a center,
  a standard deviation of the Gaussian distribution is 5" or less, and
  a following formula (1) is satisfied:

$$d = (2n-1)\frac{p}{\tan\beta} \quad (n \in N) \tag{1}$$

where d is the first length, n is a number of total reflections of the incident light at the same reflecting surface, p is an array pitch of the reflecting surfaces, β is an angle formed between a projection of the light impinging on the reflecting surface to a surface including the first and second directions and a tangential line at an arbitrary point on the reflecting surface (6.5°≤β≤87.5°), and N is a set of natural numbers).

4. The method of manufacturing the optical element according to claim 2, wherein joining the first light transmissive layer to a second light transmissive layer includes embedding at least a part of a distal end of a convex portion on the transfer surface in an adhesive.

5. The method of manufacturing the optical element according to claim 2, wherein joining the first light transmissive layer to a second light transmissive layer includes swelling a distal end of a convex portion on the transfer surface and press-bonding the swollen distal end to the second light transmissive layer such that a shape of the convex portion on the transfer surface is modified to be closer to a shape as per design values.

6. The method of manufacturing the optical element according to claim 2, wherein joining the first light transmissive layer to a second light transmissive layer includes press-bonding a distal end of a convex portion on the transfer surface to the second light transmissive layer while applying heat to the distal end of the convex portion on the transfer surface such that a shape of the convex portion on the transfer surface is modified to be closer to a shape as per design values.

* * * * *